United States Patent
Hart

(10) Patent No.: US 8,812,043 B2
(45) Date of Patent: *Aug. 19, 2014

(54) COMMUNICATION SYSTEM

(75) Inventor: Michael John Hart, London (GB)

(73) Assignee: Fujitsu Limited, Kawasaki (JP)

( * ) Notice: Subject to any disclaimer, the term of this patent is extended or adjusted under 35 U.S.C. 154(b) by 427 days.

This patent is subject to a terminal disclaimer.

(21) Appl. No.: 11/454,016

(22) Filed: Jun. 16, 2006

(65) Prior Publication Data

US 2007/0066240 A1    Mar. 22, 2007

(30) Foreign Application Priority Data

Jun. 17, 2005  (EP) .................................. 05253785

(51) Int. Cl.
*H04M 1/00*    (2006.01)

(52) U.S. Cl.
USPC ........................................................ 455/522

(58) Field of Classification Search
USPC ................. 455/7, 522, 502; 370/318
See application file for complete search history.

(56) References Cited

U.S. PATENT DOCUMENTS

| | | | |
|---|---|---|---|
| 4,261,054 A | 4/1981 | Scharla-Nielsen et al. | 455/12 |
| 5,029,164 A | 7/1991 | Goldstein | |
| 5,293,639 A | 3/1994 | Wilson et al. | 455/17 |
| 5,592,154 A | 1/1997 | Lin | |
| 5,724,659 A | 3/1998 | Daniel | |
| 6,002,690 A | 12/1999 | Takayama | |
| 6,678,248 B1 | 1/2004 | Haddock | |
| 6,907,212 B2 | 6/2005 | Harada | |
| 7,184,703 B1* | 2/2007 | Naden et al. | 455/10 |
| 7,376,122 B2 | 5/2008 | Draves | |
| 7,400,856 B2 | 7/2008 | Sartori | |
| 7,454,244 B2 | 11/2008 | Kassab | |
| 7,483,493 B2 | 1/2009 | Bar-Ness et al. | |
| 7,574,230 B1 | 8/2009 | Oh | |
| 7,609,631 B2 | 10/2009 | Stanwood | |
| 7,738,859 B2 | 6/2010 | Roy | |
| 7,865,146 B2 | 1/2011 | Hart | |
| 7,881,741 B2 | 2/2011 | Horiuchi | |
| 7,983,151 B2 | 7/2011 | Hart | |
| 8,000,651 B2 | 8/2011 | Horiuchi | |
| 2001/0008520 A1 | 7/2001 | Tiedemann, Jr. et al. | |
| 2002/0039383 A1 | 4/2002 | Zhu | |

(Continued)

FOREIGN PATENT DOCUMENTS

| | | |
|---|---|---|
| CA | 2556681 A1 | 9/2005 |
| CN | 1547862 A | 11/2004 |

(Continued)

OTHER PUBLICATIONS

Communication dated Sep. 30, 2008 forwarding Extended European Search Report in European Application No. 08151572.8-1246 with abstract and narrative.

(Continued)

*Primary Examiner* — David Bilodeau
(74) *Attorney, Agent, or Firm* — Smith, Gambrell & Russell, LLP

(57) ABSTRACT

The present application relates to a wireless communication system and related methods and apparatuses for transmitting a signal from a source apparatus to a destination apparatus, via at least one intermediate apparatus. In particular, the present invention relates to techniques which seek to improve the throughput of data in multi-hop communication systems.

27 Claims, 13 Drawing Sheets

(56) References Cited

U.S. PATENT DOCUMENTS

| | | | |
|---|---|---|---|
| 2002/0115409 A1 | 8/2002 | Khayrallah | |
| 2002/0115440 A1 | 8/2002 | Hamabe | |
| 2003/0097460 A1 | 5/2003 | Higashiyama | |
| 2003/0123401 A1* | 7/2003 | Dean | 370/318 |
| 2003/0125067 A1 | 7/2003 | Takeda | |
| 2003/0156554 A1* | 8/2003 | Dillinger et al. | 370/318 |
| 2003/0165127 A1 | 9/2003 | Fujiwara | |
| 2003/0198204 A1 | 10/2003 | Taneja | |
| 2003/0202476 A1 | 10/2003 | Billhartz | |
| 2004/0001464 A1 | 1/2004 | Adkins | |
| 2004/0123229 A1 | 6/2004 | Kim | |
| 2004/0219876 A1* | 11/2004 | Baker et al. | 455/7 |
| 2004/0266339 A1 | 12/2004 | Larsson | |
| 2005/0014464 A1* | 1/2005 | Larsson | 455/11.1 |
| 2005/0048914 A1 | 3/2005 | Sartori | |
| 2005/0048983 A1 | 3/2005 | Abraham | |
| 2005/0063356 A1 | 3/2005 | Larsen et al. | 370/351 |
| 2005/0213587 A1 | 9/2005 | Cho | |
| 2005/0249162 A1 | 11/2005 | Kim | |
| 2005/0249164 A1 | 11/2005 | Kwak | |
| 2005/0272366 A1 | 12/2005 | Eichinger | |
| 2005/0288020 A1 | 12/2005 | Cho | |
| 2006/0040697 A1 | 2/2006 | Komatsu | |
| 2006/0067243 A1 | 3/2006 | Bejerano | |
| 2006/0209671 A1 | 9/2006 | Khan | |
| 2006/0227796 A1 | 10/2006 | Wei | |
| 2006/0264172 A1 | 11/2006 | Izumikawa | |
| 2007/0050495 A1 | 3/2007 | Sridhar et al. | |
| 2007/0066239 A1* | 3/2007 | Hart | 455/69 |
| 2007/0066240 A1* | 3/2007 | Hart | 455/69 |
| 2007/0066241 A1 | 3/2007 | Hart | |
| 2007/0066337 A1* | 3/2007 | Hart | 455/522 |
| 2007/0081507 A1 | 4/2007 | Koo | |
| 2007/0116106 A1* | 5/2007 | Hart | 375/227 |
| 2008/0009243 A1* | 1/2008 | Hart | 455/67.13 |
| 2008/0049718 A1 | 2/2008 | Chindapol | |
| 2008/0165720 A1* | 7/2008 | Hu et al. | 370/315 |
| 2008/0225774 A1 | 9/2008 | Kim | |
| 2009/0185479 A1 | 7/2009 | Hart | |
| 2010/0110973 A1* | 5/2010 | Hart | 370/315 |
| 2010/0111027 A1* | 5/2010 | Hart | 370/329 |

FOREIGN PATENT DOCUMENTS

| | | | |
|---|---|---|---|
| CN | 1859364 A | 11/2006 | |
| EP | 1388936 A2 | 2/2004 | |
| EP | 1753188 A1 | 2/2007 | |
| EP | 1761080 A1 | 3/2007 | |
| EP | 1773091 A2 | 4/2007 | |
| EP | 1801995 A1 | 6/2007 | |
| GB | 2440982 A | 2/2008 | |
| GB | 2440984 A | 2/2008 | |
| GB | 2440985 A | 2/2008 | |
| GB | 2443466 A | 5/2008 | |
| GB | 2443465 A | 7/2008 | |
| JP | 3166831 A | 7/1991 | |
| JP | 6505371 | 8/1992 | |
| JP | 7264651 A | 10/1995 | |
| JP | 2002185382 A | 6/2002 | |
| JP | 2003124876 A | 4/2003 | |
| JP | 2003258719 A | 9/2003 | |
| JP | 2004032393 A | 1/2004 | |
| JP | 2004173123 A | 6/2004 | |
| JP | 2005033625 A | 2/2005 | |
| JP | 2005142676 A | 6/2005 | |
| JP | 2005142968 A | 6/2005 | |
| JP | 2005159900 A | 6/2005 | |
| KR | 1020030049031 A1 | 6/2003 | |
| WO | 9214309 A1 | 8/1992 | |
| WO | 9746038 A2 | 12/1997 | |
| WO | 9836509 A1 | 8/1998 | |
| WO | 0077948 A1 | 12/2000 | |
| WO | WO 01/50635 A1 | 7/2001 | H04B 7/24 |
| WO | 0163849 A2 | 8/2001 | |
| WO | 03044970 A2 | 5/2003 | |
| WO | WO03/044970 A2 | 5/2003 | |
| WO | 200475468 A2 | 9/2004 | |
| WO | 2004107693 A1 | 12/2004 | |
| WO | 2004112282 A1 | 12/2004 | |
| WO | WO 2004/107693 A1 | 12/2004 | H04L 25/52 |
| WO | 2005013507 A1 | 2/2005 | |
| WO | 2005020517 A1 | 3/2005 | |
| WO | 2005025110 A3 | 3/2005 | |
| WO | 2005053338 A1 | 6/2005 | |
| WO | 2005064872 A1 | 7/2005 | |
| WO | 2005088914 A1 | 9/2005 | |
| WO | 2005125109 A2 | 12/2005 | |
| WO | 2006020032 A1 | 2/2006 | |
| WO | 2006080507 A1 | 8/2006 | |
| WO | 2006099024 A2 | 9/2006 | |
| WO | 2006101013 A1 | 9/2006 | |
| WO | 2006130964 A1 | 12/2006 | |
| WO | 2007003142 A1 | 1/2007 | |
| WO | 2007019672 A1 | 2/2007 | |
| WO | 2007028252 A2 | 3/2007 | |

OTHER PUBLICATIONS

European Search Report; EP 05253785 dated Oct. 19, 2005.
Notice of Allowance dated Apr. 26, 2011 received in U.S. Appl. No. 11/453,839.
Non-Final Office Action dated May 20, 2011 received in U.S. Appl. No. 12/973,086.
Final Office Action dated May 17, 2011 received in U.S. Appl. No. 11/453,055.
Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917.
Daehyon Kim, et al. "Fair and efficient multihop scheduling algorithm for IEEE 802.16 BWA systems" Broadband Networks, 2005 2nd International Conference onMA Oct. 3-7, 2005, Piscataway, NJ, USA, IEEE pp. 895-901.
Extended European Search Report dated Mar. 1, 2010 received in corresponding European Patent No. 09172393.2-2416/2141870.
International Search Report issued in PCT/GB2007/002909 dated Mar. 2, 2007.
Kaneko S. et al, "Proposed Relay Method with P-MP Structure of IEEE 802.16-2004" Personal, Indoor and Mobile Radio Communications, 2005. PIMRC 2005, IEEE 16th International Symposium on Berlin, Germany Sep. 11-14, 2005, Piscataway, NJ, USA, IEEE, pp. 1606-1610, XP010926479 Paragraph [0011]—paragraph [00IV].
Non-Final Office Action dated dated Mar. 21, 2011 received in U.S. Appl. No. 12/226,344.
Search Report Issued in Priority United Kingdom application No. 0704093.4 dated Jul. 3, 2007.
United Kingdom Search Report dated Apr. 19, 2007 for application No. GB0705225.1.
United Kingdom Search Report dated May 23, 2007 for application No. GB0705225.1.
Non-Final Office Action dated Jun. 22, 2011 received in U.S. Appl. No. 11/637,025.
Final Office Action dated Jun. 23, 2011 received in U.S. Appl. No. 11/453,045.
Non-Final Office Action dated Jun. 27, 2011received in U.S. Appl. No. 12/226,319.
Notice of Allowance dated May 23, 2011 received in U.S. Appl. No. 11/453,839.
Japanese Office Action dated May 10, 2011 received in JP2006-167984.
Non-Final Office Action dated Jun. 16, 2011 received in U.S. Appl. No. 11/454,028.
Extended European Search Report dated Feb. 2, 2011 received in 06252979.7-1246/1734669.
Notice of Allowance dated Jul. 28, 2011 received in U.S. Appl. No. 11/453,839.
Japanese Office Action dated May 24, 2011 received in JP2006342666.

(56) References Cited

OTHER PUBLICATIONS

Japanese Office Action dated May 31, 2011 received in JP2006167981.
Japanese Office Action dated May 10, 2011 received in JP2006-167982.
Apostolopoulos, J.G. et. al. "Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.
British Search Report for Application No. GB0622120.4 dated Dec. 6, 2006.
European Search Report EP05253767 dated Oct. 17, 2005.
European Search Report; EP 0525 3768 dated Oct. 14, 2005.
First Notification of Office Action dated Apr. 3, 2009 received in corresponding Chinese Application No. 200610172053.7.
European Search Report dated Oct. 18, 2005 received in EP05253783.
Final Office Action dated Dec. 15, 2009 received in U.S. Appl. No. 11/454,028.
European Search Report; EP 05253766 dated Oct. 13, 2005.
Final Office Action dated Dec. 28, 2010 received in U.S. Appl. No. 11/454,028.
European Office Action issued Jan. 17, 2011 in application 07 766 391.2-2415.
Mona Ghassemian, Vasilis Friderikos, Hamid Aghvami; Hybrid Handover in Multihop Radio Access Networks; Sep. 2005; document No. XP-010855829.
IEEE Std. 802.11g-2003 IEEE Standard for Information technology—Telecommunications and information exchange between systems—Local and metropolitan area networks—Specific requirements Part 11: Wireless LAN Medium Accedd Control (MAC) and Physical Layer (PHY) specifications Amendment 4: Further Higher Data Rate Extension in the 2.4 Ghz Band IEEE Computer Society, Jun. 27, 2003.
IEEE Std. 802.16-2004 IEEE Standard for Local and metropolitan area networks Part 16: Air Interface for Fixed Broadband Wireless Access Systems IEEE Computer Society and the IEEE Microwave Theory and Techniques Society, Oct. 1, 2004.
IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands." Dated Feb. 28, 2006.
IEEE 802.11 a/g standard: "Wireless LAN Medium Access Control (MAC) and Physical Layer (PHY) specifications" Jun. 27, 2003.
International Search Report for PCT/GB2007/002902(dated Dec. 14, 2007).
International Search Report dated Oct. 25, 2007 rec'd in PCT/GB2007/002891.
Non-Final Office Action dated Jan. 5, 2010 received in U.S. Appl. No. 11/637,025.
Final Office Action dated Jul. 6, 2010 recevied in U.S. Appl. No. 11/637,025.
Non-Final Office Action dated Aug. 23, 2010 rec'd in U.S. Appl. No. 12/613,342.
Non-Final Office Action dated Jun. 16, 2010 received in U.S. Appl. No. 12/613,367.
Non-Final Office Action dated Nov. 29, 2010 received in U.S. Appl. No. 11/453,055.
Final Office Action dated Mar. 24, 2010 received in U.S. Appl. No. 11/453,055.
Non-Final Office Action dated Jul. 16, 2009 received in U.S. Appl. No. 11/453,055.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Advisory Action dated Jul. 2, 2010 received in U.S. Appl. No. 11/453,055.
Advisory Action dated Apr. 29, 2010 received in U.S. Appl. No. 11/454,028.
Final Office Action dated Mar. 9, 2011 received in U.S. Appl. No. 12/613,342.
Non-Final Office Action dated Jun. 30, 2010 received in U.S. Appl. No. 11/454,028.
Final Office Action dated Jan. 25, 2011 received in U.S. Appl. No. 12/613,367.
Non-Final Office Action dated Apr. 10, 2009 received in U.S. Appl. No. 11/454,028.
Zhang Jingmei et al.: "Adaptive optimal transmit power allocation for two-hop non-regenerative wireless relaying system", Vehicular Technology Conference, 2004. VTC 2004-spring. 2004 IEEE 59th Milan, Italy May 17-19, 2004, Piscataway, NJ, USA, IEEE, US, vol. 2, May 17, 2004, pp. 1213-1217.
Notice of Allowance dated Jan. 13, 2011 received in U.S. Appl. No. 11/453,839.
Non-Final Office Action dated Jun. 8, 2010 received in U.S. Appl. No. 11/453,839.
Final Office Action dated Aug. 2, 2010 received in U.S. Appl. No. 11/453,045.
Non-Final Office Action dated Dec. 1, 2009 received in U.S. Appl. No. 11/453,045.
Non-Final Office Action dated Jan. 6, 2011 received in U.S. Appl. No. 11/453,045.
European Search Report EP05253784 dated Oct. 17, 2005.
First Notification of Office Action in corresponding 200610095607.8 dated Feb. 6, 2009.
Sreng V. et al.: Relayer selection strategies in cellular networks with peer-to-peer relaying, Vehicular Technology Conference, 2003. 2003 IEEE 58th Orlando, Fl., USA Oct. 6-9, 2003, Piscataway, NJ, USA, IEEE, US, Oct. 6, 2003, pp. 1949-1953.
Final Office Action dated Aug. 23, 2012 received in U.S. Appl. No. 12/613,367.
Non-Final Office Action dated Aug. 2, 2012 received in U.S. Appl. No. 11/453,055.
Final Office Action dated Aug. 14, 2012 received in U.S. Appl. No. 12/613,342.
Non-Final Office Action dated Oct. 3, 2012 received in U.S. Appl. No. 13/168,500.
Japanese Office Action dated Mar. 21, 2012 received in JP2009-530924.
Notification of Reasons for Refusal dated Apr. 24, 2012 received in JP2006-167986.
Final Notification for Reasons for Refusal dated Feb. 14, 2012 received in JP2009-535780.
Modification for Enabling RS Operations dated Nov. 2005 by Tzu-Ming Lin, Chang-Lung Hsiao, Rodger Tseng and Wem-Ho Sheen ITRI Computer and Communications Research Labs, Tawain, R.O.C.
Notice of Allowance received in U.S. Appl. No. 11/454,028 dated May 24, 2012.
Japanese Office Action dated May 29, 2012 received in Japanese Patent Application No. JP2011-081524.
Final Office Action dated Jun. 26, 2012 received in U.S. Appl. No. 12/226,344.
Non-Final Office Action dated Jul. 10, 2012 received in U.S. Appl. No. 12/226,319.
Office Action dated Jul. 5, 2011 received in corresponding Japanese Patent Application No. 2009-091471.
Japanese Office Action dated Feb. 1, 2011 received in corresponding Japanese Patent Application 2006167985.
Japanese Office Action dated May 10, 2011 received in corresponding Japanese Patent Application 2006167983.

(56) References Cited

OTHER PUBLICATIONS

Final Office Action dated Oct. 14, 2011 received in U.S. Appl. No. 12/226,319.
Final Office Action dated Oct. 25, 2011 received in U.S. Appl. No. 12/226,344.
Non-Final Office Action dated Oct. 31, 2011 received in U.S. Appl. No. 12/301,414.
Notice of Allowance dated Nov. 7, 2011 received in U.S. Appl. No. 11/453,839.
Notification of Reason for Refusal dated Sep. 6, 2011 received in corresponding Japanese Patent Application 2006167986.
Notice of Allowance dated Nov. 23, 2011 received in U.S. Appl. No. 12/973,086.
Notice of Allowance dated Sep. 28, 2011 received in U.S. Appl. No. 12/973,086.
Non-Final Office Action dated Jan. 26, 2012 received in U.S. Appl. No. 12/226,319.
Notice of Allowance dated Jan. 19, 2012 received in U.S. Appl. No. 11/454,028.
Decision of Refusal dated Oct. 11, 2011 received in Japanese Patent Application No. 2006-167984.
Decision of Refusal dated Oct. 11, 2011 received in Japanese Patent Application No. 2006-167982.
Japanese Office Action dated Dec. 13, 2011 received in JP2009-529749.
Chinese Office Action dated Aug. 12, 2011 received in 200780033647.2.
Japanese Office Action dated Jun. 14, 2011 received in JP2009-535780.
Japanese Office Action dated Jun. 28, 2011 received in JP2009-091469.
Non-Final Office Action dated Jan. 12, 2012 received in U.S. Appl. No. 12/613,367.
Notice of Allowance dated Dec. 22, 2011 received in U.S. Appl. No. 11/453,839.
Non-Final Office Action dated Feb. 7, 2012 received in U.S. Appl. No. 12/613,342.
Notice of Allowance dated Mar. 8, 2012 received in U.S. Appl. No. 12/301,414.
Non-Final Office Action dated Feb. 13, 2012 received in U.S. Appl. No. 12/226,344.
Non-Final Office Action dated Dec. 10, 2012 received in U.S. Appl. No. 12/226,344.
Non-Final Office Action dated Jan. 10, 2013 received in U.S. Appl. No. 12/613,342.
Japanese Office Action dated Mar. 12, 2013 received in Patent Appeal No. 2012-516.
Final Office Action dated Dec. 14, 2012 received in U.S. Appl. No. 11/453,055.
Notification of Reason(s) for Refusal dated Dec. 18, 2012 received in Japanese Patent Application No. 2011-191107.
Non-final Office Action dated Jun. 17, 2013 received in U.S. Appl. No. 12/513,805.
Non-final Office Action dated Apr. 22, 2013 received in U.S. Appl. No. 12/226,319.
Notice of Allowance dated Jun. 21, 2013 received in U.S. Appl. No. 11/454,028.
Final Office Action dated Jul. 9, 2013 received in U.S. Appl. No. 13/168,500.
Final Office Action dated Jun. 26, 2013 received in U.S. Appl. No. 12/226,344.
Non-final Office Action dated Jul. 19, 2013 received in U.S. Appl. No. 11/453,055.
Non-final Office Action dated Jul. 24, 2013 received in U.S. Appl. No. 12/226,319.
Notice of Allowance dated Aug. 5, 2013 received in U.S. Appl. No. 12/613,342.
Notice of Allowance dated Aug. 16, 2013 received in U.S. Appl. No. 12/613,367.
Notice of Allowance dated Jan. 16, 2013 received in U.S. Appl. No. 11/454,028.
Non-Final Office Action dated Jan. 9, 2013 received in U.S. Appl. No. 12/613,367.
Non-Final Office Action dated Nov. 20, 2012 received in U.S. Appl. No. 12/226,319.
3rd Notification of Chinese Office Action dated Jul. 15, 2013 received in Application No. 200910167069.2.
Notice of Allowance dated Oct. 16, 2013 received in U.S. Appl. No. 12/226,344.
Notice of Allowance dated Nov. 6, 2013 received in U.S. Appl. No. 12/226,319.
Non-final Office Action dated Oct. 31, 2013 received in U.S. Appl. No. 13/168,500.
Final Office Action dated Mar. 31, 2014 received in U.S. Appl. No. 11/453,055.

* cited by examiner

SINR at cell edge for UE connected to RN for RN at 0.5 of cell radius
(two cell analysis)

SINR at the UE as a function of NB and RN transmit
power with RN positioned at 0.5 cell radius.

SINR at cell edge for UE connected to RN for RN at 0.75 of cell
radius (two cell analysis)

SINR at the UE as a function of NB and RN transmit
power with RN positioned at 0.75 cell SINR at cell edge for UE connected to RN (RN at 0.5 of cell radius of 1867m)(AF with TDD)

SINR at the UE as a function of NB and RN transmit power with RN positioned at 0. 5 cell SINR at the UE as a function of NB and RN transmit power with RN positioned at 0.75 cell radius.

Optimal NB transmit power as a function of RN transmit power for a regenerative relay for FDD and TDD and for each deployment scenario.

Optimal NB transmit power as a function of RN transmit power for a non-regenerative relay for FDD for each deployment scenario.

Optimal NB transmit power as a function of RN transmit power for a non-regenerative relay for FDD for each deployment scenario.

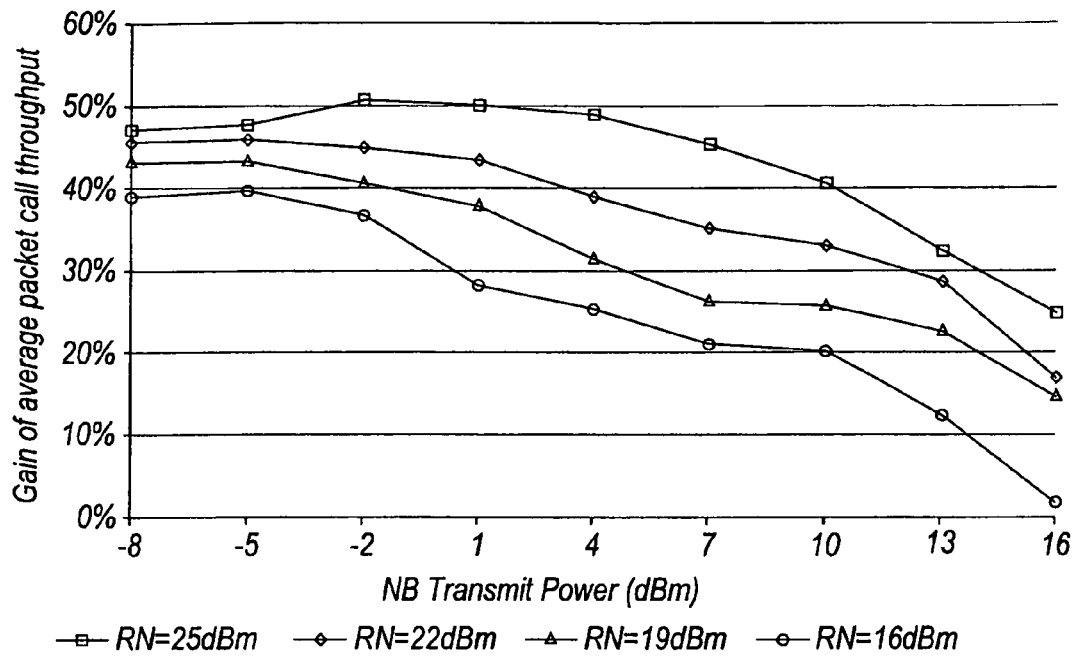
Fig. 8A  Gain in average packet call throughput for deployment scenario 1.
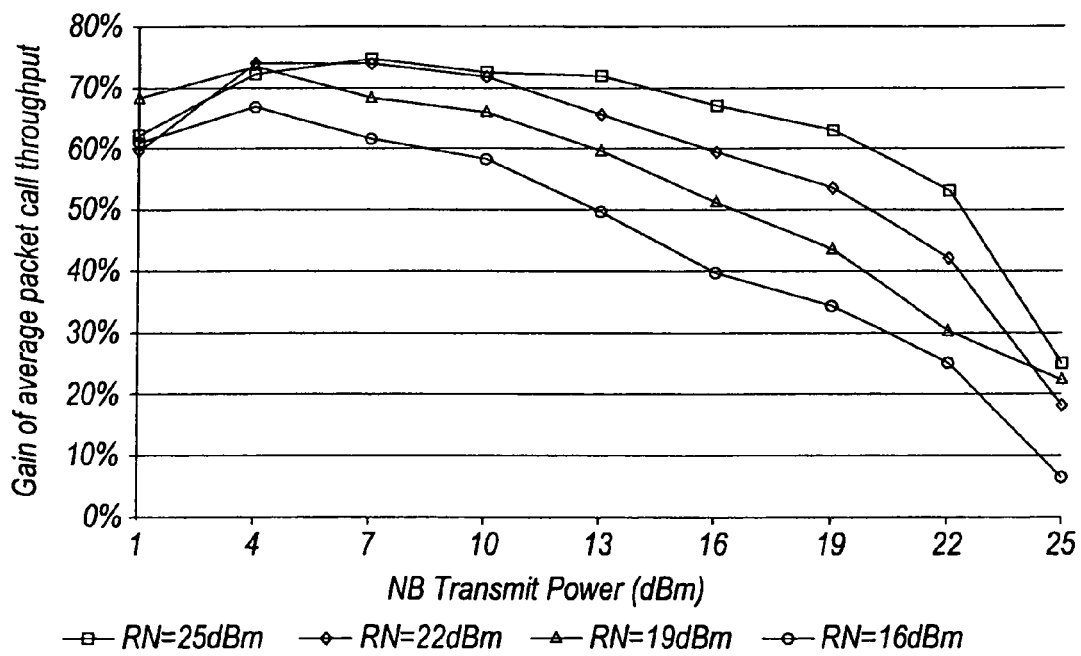
Fig. 8B  Gain in average packet call throughput for deployment scenario 2.

Optimal NB transmit power as a function of RN transmit power for a non-regenerative relay for TDD for each deployment scenario where it is assumed the NB to UE link has a 3 dB gain compared with the other links.

COMMUNICATION SYSTEM

The present invention relates to a wireless communication system and related methods for transmitting a signal from a source apparatus to a destination apparatus, via at least one intermediate apparatus. In particular, the present invention relates to techniques which seek to improve the throughput of data in multi-hop communication systems.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \qquad (A)$$

Where d (meters) is the transmitter-receiver separation, b(db) and n are the pathloss parameters and the absolute pathloss is given by $l = 10^{(L/10)}$.

FIG. 1A illustrates a single-cell two-hop wireless communication system comprising a base station (known in the context of 3G communication systems as "node-B" (NB)) a relay node (RN) and a user equipment (UE). In the case where signals are being transmitted on the downlink (DL) from a base station to a destination user equipment (UE) via the relay node (RN), the base station comprises the source apparatus (S) and the user equipment comprises the destination apparatus (D). In the case where communication signals are being transmitted on the uplink (UL) from user equipment (UE), via the relay node, to the base station, the user equipment comprises the source apparatus and the base station comprises the destination apparatus. The relay node is an example of an intermediate apparatus (I) and comprises: a receiver, operable to receive a signal from the source apparatus; and a transmitter, operable to transmit this signal, or a derivative thereof, to the destination apparatus.

Table I below gives some examples of the calculated pathloss of a signal being transmitted over the different links: source to destination (SD), source to intermediate (SI) and intermediate to destination (ID), in a multi-hop transmission system where b and n are assumed to remain the same over each of the links.

TABLE I

| b(dB) | n | Separation (metres) | | | Pathloss in dB | | | Absolute Pathloss | | |
|---|---|---|---|---|---|---|---|---|---|---|
| | | SD | SI | ID | SD | SI | ID | SD | SI | ID |
| 15.3 | 3.76 | 1000 | 500 | 500 | 128.1 | 116.8 | 116.8 | 6.46E12 | 4.77E11 | 4.77E11 |
| 15.3 | 3.76 | 1000 | 600 | 600 | 128.1 | 119.76 | 119.76 | 6.46E12 | 9.46E11 | 9.46E11 |
| 15.3 | 3.76 | 1000 | 700 | 700 | 128.1 | 122.28 | 122.28 | 6.46E12 | 1.69E12 | 1.69E12 |

The examples calculated above demonstrate that the sum of the absolute path losses experienced over the indirect link SI+ID may be less than the pathloss experienced over the direct link SD. In other words it is possible for:

$$L(SI) + L(ID) < L(SD) \qquad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) should be achieved if a signal is sent from a source apparatus to a destination apparatus via an intermediate apparatus (eg relay node), rather than being sent directly from the source apparatus to the destination apparatus. If implemented, multi-hop communication systems could potentially allow for a reduction in the transmit power of transmitters which facilitate wireless transmissions, which would lead to a reduction in interference levels as well as decreasing exposure to electromagnetic emissions.

Clearly, due to the non-linear relationship between pathloss and distance, the position of an intermediate apparatus relative to the source and destination, will critically effect the potential gain that a multi-hop transmission may have as compared to a direct, or single-hop, transmission between the source and destination. This is illustrated in FIG. 2A which shows a graphical representation of the theoretical gain which may be achieved by multi-hop transmissions, and plots the total power loss (dB) against the relative normalised position of the intermediate apparatus between the source apparatus and the destination apparatus.

Considering firstly the case where the intermediate node is positioned on the line of the direct link between the source and destination (in which case the path extension factor (s)=1), it can be seen that the potential gain is reduced as the relay node is moved away from a mid-way position towards the source or destination apparatus. Likewise, as the position of the intermediate apparatus is moved away from the line of the direct link, thereby extending the total path length of the sum of the two transmission segments (and increasing the path extension factor to s=1.1, s=1.2 etc), it can be seen that the graphical region of theoretical gain is again reduced.

However, simulations carried out to test the applicability of multi-hop communication systems have revealed unexpectedly low gains in throughput of data. Indeed, the gains experienced are well below the potential gain suggested by a simple analysis based on the pathloss equation A. Consequently, and despite the potential advantages that multi-hop systems may demonstrate in terms of signal range extension, a possible reduction in the overall transmit power required to transmit a signal between a source and destination, and the connectivity of otherwise inaccessible nodes, wireless systems operators have been deterred from implementing multi-hop networks.

One of the reasons that such a discrepancy exists between the predicted gain and the simulated gain is that previous predictions have been based on the assumption that the pathloss parameters b and n are the same on all links. In actual fact, these values vary as a result of the antenna height of the source apparatus and destination apparatus as compared to the height of the relay node. Thus, a more realistic table of values is given below in table II. The values labelled 3GPP are obtained from adapting the model employed by the 3GPP to incorporate the fact that the antenna height of the intermediate apparatus is typically somewhere between the height of the antenna at the source and destination apparatus. The values labelled UoB are derived from modelling conducted by the University of Bristol based on a typical deployment in the city of Bristol.

TABLE II

| | | Link | | |
|---|---|---|---|---|
| Pathloss Parameter | | S-D | S-I | I-D |
| 3GPP | b (dB) | 15.3 | 15.5 | 28 |
| | n | 3.76 | 3.68 | 4 |
| UoB | b (dB) | 13.07 | 16.29 | 10.04 |
| | n | 4.88 | 4.64 | 5.47 |

The graphical illustration of total pathloss verses normalised relay node position using the pathloss parameters tabulated in table II is shown in FIG. 2B. It can be seen that the perfect "bell-shape" of FIG. 2A is not achieved when a more realistic set of pathloss parameters are used to calculate the variation in total pathloss as the position of a theoretical relay node is adjusted. Indeed, the region of gain is reduced and it is apparent that relatively small changes in the position of a relay node or a user equipment, leading to a change in the absolute pathloss over the communication link, will have a significant effect on the quality of a communication signal at the receiving apparatus. Thus, the positioning of an intermediate apparatus or relay node is critical if a gain is to be achieved by the occurrence of a multi-hop transmission, as compared to a direct transmission between the source and destination.

However, even when predictions are based on a more accurate reflection of the pathloss parameters likely to be encountered in the real world, simulations of multi-hop systems have revealed unexpectedly poor correspondence between the predicted and simulated gain.

Embodiments of the present invention seek to provide a communication system comprising a source apparatus, a destination apparatus and at least one intermediate apparatus, wherein the source apparatus and the or each intermediate apparatus each comprise a transmitter, operable to transmit a communication signal or a signal derived therefrom, in a communication direction towards said destination apparatus, and wherein the destination apparatus and the, or each, intermediate apparatus each comprise a receiver, operable to receive said communication signal, or a signal derived therefrom, wherein said communication system comprises a determining means, operable to determine a measure of, or a change in a measure of, the resource allocated to one or more of said transmitters that will tend to substantially attain or maintain a balance between:
i) a measure of the quality of the communication signal received at the destination apparatus; and
ii) measure of the quality of the communication signal received at the, or each, intermediate apparatus.

It will, of course, be appreciated that the communication signal actually received by the destination apparatus may be the communication signal transmitted by the source apparatus, or it may be a communication signal derived therefrom.

Thus, preferred embodiments of the present invention seek to maintain or achieve a "balance" in a measure of the quality of a communication signal being received at the or each intermediate apparatus and a measure of the quality of a communication signal being received at a destination apparatus. Preferably, the determining means is operable to determine a change in the transmit power of one or more of the apparatuses which are operable to transmit a communication signal present communication system embodying the present invention, in order to reduce or prevent substantial imbalance (i.e. achieve or maintain a substantial "balance") between a measure of the quality of a communication signal received at the intermediate apparatus and a measure of the quality of a communication signal received at the destination apparatus.

The existence of an imbalance arising in a communication system embodying the present invention may be apparent from a direct comparison of a measure of a quality of a communication signal received at the destination apparatus and a measure of a quality of a communication signal received at the, or one of the, intermediate apparatuses. Alternatively, an imbalance may be apparent when a comparison is made via a mapping function. Hence the situation may exist where measures of equal value do not equate to a balanced system, and likewise where measures of differing value may equate to a balanced system.

It is envisaged that embodiments of the present invention may be used, prior to deployment of a multi-hop system, to optimise the system and/or to substantially balance a measure of the quality of a communication signal received at the, or each intermediate apparatus and a measure of the quality of a communication signal received at the destination apparatus. It is also envisaged that embodiments of the present invention may be implemented within an existing multi-hop system in order to seek to achieve and maintain "balance" in a measure of the quality of a communication signal across all links. Thus, the present invention may be employed within a multi-hop communication system to establish a substantial "balance" between an indicator of the RSS or the SINR at the destination apparatus and an indicator of the RSS or the SINR, at the, or each, intermediate apparatus. The transmit powers will advantageously be optimised initially with respect to a target received signal quality for one of the apparatuses operable to receive a communication signal in a multi-hop system. This will usually be the destination apparatus. Thus, an indicator of a measure of the variation of the quality of a communication signal received at the destination from a target received signal quality (="variation from target" indicator), will advantageously be minimal when a system has been optimised according to embodiments of the present invention. Thereafter, if a change is detected in the variation from target indicator, which may be in a positive or negative sense, e.g. if the quality of the communication signal has deteriorated or improved, or if the target set for the apparatus has changed, the variation from target indicator will increase. In this case, embodiments of the present invention which enable a deviation of the variation from target indicator from a desired value to be detected, will advantageously seek to bring the variation from target indicator to the desired value.

Simulations of multi-hop communication systems embodying the present invention have been found to demonstrate a significant gain over systems in which a signal is transmitted directly to a destination apparatus. Indeed, the results of system level simulations carried out to test a preferred embodiment of the present invention indicate that a communication system which is "balanced" within the context of the present invention, can be expected to fulfil the advantages associated with multi-hop transmissions and to provide an improvement in the throughput of data.

It is believed that one explanation for the improved throughput demonstrated by preferred embodiments of the present invention is that they permit a reduction in the absolute transmit power required in a multi-hop system. This is considered in more detail below.

Starting from the principle already demonstrated above, that by splitting a single direct transmission link into two shorter transmission links, a reduction in the total pathloss experienced by a signal is achieved. Then, the total transmit power required to transmit a communication signal from a source apparatus to a destination apparatus via at least one intermediate apparatus, will be less than is required to transmit the communication signal directly between the source apparatus and the destination apparatus. Thus, less transmit power is needed in order to ensure that the destination apparatus (and possibly also the intermediate apparatus) receives a minimum or "target" signal quality. If no adjustment is made to the transmit power, then significant excess transmit power (i.e. transmit power exceeding that required to achieve a good, or target, signal quality at the destination apparatus and/or the intermediate apparatus) will result. Rather than serving to further increase the gain achieved by a multi-hop communication as compared to a direct communication between a source apparatus and a destination apparatus, this excess transmit power will merely increase interference levels leading to a deterioration in the quality of the communication link. This deterioration will tend to counteract the potential gain of a multi-hop system which accounts for the poor simulation results of previously considered multi-hop communication systems.

Furthermore, the overall throughput across a two-hop network (for example) is limited by the lower of: the number of data packets received at the intermediate apparatus and the number of data packets received at the destination apparatus. The number of data packets received at a receiver is dependent upon the quality of the communication link that terminates at that receiver. This may be reflected, for example, by a measure of the throughput, a measure of the received signal strength (RSS) or a measure of the signal-to-interference plus noise ratio (SINR). Thus, in effect, the receiver which receives the lowest quality communication signal within a multi-hop system forms a "bottle neck" for data packet transmission, thereby wasting capacity for data transfer on other links within the multi-hop system. An increase the transmit power at a transmitter which does not serve to improve the lowest quality communication signal, will result in additional excess transmit power. Consequently, a further degradation is experienced in the performance of the system. This is illustrated in FIGS. 9A and 9B which plot the variation of the gain in average packet throughput observed by users of a two-hop system compared to that observed for a single hop system, against the transmit power of the source apparatus (NB). Each graph includes four different plots, each representing a different transmit power of the intermediate apparatus. It can be seen that as the transmit power of the base station is increased beyond an optimal point, then a significant degradation in gain will be experienced despite the emission of more signal energy.

It can therefore be appreciated that the improvements made by preferred embodiments of the present invention can be attributed to the way in which the various aspects of the present invention seek to ensure that any imbalance between a measure of the quality of a communication signal received at the destination apparatus and a measure of the quality of a communication signal received at the, or each, intermediate apparatus is reduced or prevented. Thus, excess transmit power which cannot improve the throughput of data packets and which will only serve to raise interference levels, is minimised.

There are a number of different events which, if they arise, can potentially lead to an "imbalance" (i.e. a difference between a measure of the quality of a communication signal received at the destination apparatus and a measure of the quality of a communication signal received at the or each intermediate apparatus) in a multi-hop system:
 i) The pathloss arising over one of the links changes. This may be due to the position of one or both of the transmitter and receiver for that link changing, or due to a change in the environmental conditions or interference levels arising between the transmitter and the receiver.
 ii) It is usual for an apparatus which is operable to receive a communication signal, to have a target RSS or target SINR. This is usually set by the network provider and may vary depending on the characteristics of the communication system or receiving apparatus, or depending on the type of data to be transmitted. The target RSS/SINR of a mobile phone or other user equipment may vary and any change in target can be accommodated for by adjusting the transmit power of the transmitting apparatus in such a way as to tend to minimise a measure of the variation of the quality of a communication signal received at the destination apparatus from a target received signal quality (i.e. "variation from target"). In the case of a multi-hop system, merely adjusting the transmit power of one apparatus in order to accommodate a change in target of one of the receiving apparatuses, will lead to an imbalance within the system.

Embodiments of the present invention seek to provide a way of responding to an imbalance, or a potential imbalance, which arises as a result of each of these possible events in order to improve the throughput of data being transmitted on the uplink (UL) from a source apparatus to a base station via one or more intermediate apparatuses. In a standard communications system the uplink is the link between the UE and the NB. In the multi-hop case the UL refers to the link in which communication is directed towards the NB (e.g. UE to RN, RN to RN in the direction of NB and RN to NB). Furthermore, embodiments of the present invention seek to provide a way of optimising a multi-hop system whereby any target quality set by one or more of the receivers is substantially attained and the throughput of data across each link is substantially equal.

According to a first aspect of the present invention there is provided a communication system comprising a source apparatus, a base station and at least one intermediate apparatus, the source apparatus being operable to transmit a communication signal, via the or each intermediate apparatus, to the base station, wherein the base station comprises indicator derivation means operable to derive one or more indicators of the quality of a communication signal received at the base station, the system comprising:
 i) indicator deviation detection means, operable to detect a deviation in the, or one of the, indicators derived by the base station;
 ii) control means, provided in the base station, comprising a first calculation means operable, following detection of such a change, to calculate a new transmit power for the intermediate apparatus, or a new transmit power for the intermediate apparatus and the source apparatus, that will tend to: a) substantially reduce an imbalance between a measure of a quality of a communication signal received at the intermediate apparatus and a measure of the quality of a communication signal received at the base station; or b) substantially prevent said imbalance from arising.

Embodiments of the first aspect of the present invention advantageously provide a way of responding to a deviation from a desired value which may be due to i) a change in pathloss between the intermediate apparatus and the base station by calculating a new transmit power for the intermediate apparatus; or ii) responding to a potential imbalance which could result following a change in the target of the base station apparatus by calculating the transmit power for the intermediate apparatus and/or the source apparatus.

In accordance with an embodiment of the first aspect of the present invention, one of the indicators derived by said base station may comprises a measure of the strength of a communication signal received at the destination apparatus (eg RSS). Alternatively or additionally, one of the indicators derived by the base station may comprise a measure of the signal-to-interference plus noise ratio (SINR) of a communication signal received at the destination apparatus, or it may comprise a measure of the variation of the quality of a communication signal received at the destination apparatus from a target received signal quality set for the destination apparatus. An indicator of the variation from target may be a variation from target RSS, a variation from target SINR or a variation from a target which is based on a combination of RSS and SINR.

Preferably, the imbalance which embodiments of the first aspect of the present invention seeks to reduce or prevent comprises a difference between a measure of the signal-to-interference plus noise ratio of a communication signal received at the base station and a measure of signal to interference plus noise ratio of a communication signal received at the, or one of the, intermediate apparatuses.

According to a second aspect of the present invention there is provided a communication system comprising a source apparatus, a base station and at least one intermediate apparatus, the source apparatus being operable to transmit a communication signal, via the or each intermediate apparatus, to the base station, said base station comprising a control means, wherein each of the base station and the intermediate apparatus comprise: indicator derivation means operable to derive one or more indicators of the quality of a communication signal received at the base station or the intermediate apparatus respectively, wherein said control means is operable to receive one said indication from each of said intermediate apparatus and said base station, the control means comprising:
  i) imbalance detection means operable to detect an imbalance between one said indicator derived by the base station and one said indicator derived by the intermediate apparatus; and
  ii) calculation means operable, following detection of such an imbalance, to calculate a new transmit power for the source apparatus which will tend to substantially reduce said imbalance.

Embodiments of the second aspect of the present invention advantageously provide a way of adjusting the transmit power of the source apparatus in order to tend to achieve or maintain balance between the quality of a communication signal received at the base station and the quality of a communication signal received at the intermediate apparatus. In particular, embodiments of the second aspect of the present invention advantageously provide a means for responding to an imbalance which arises due to a change in pathloss between the source apparatus and the intermediate apparatus.

According to embodiments of the second aspect of the present invention, one said indicator derived by each of the intermediate apparatus and the destination apparatus comprises a measure of the strength of a communication signal received at the destination apparatus or the intermediate apparatus respectively (eg RSS). Alternatively or additionally, one said indicator derived by each of said intermediate apparatus and said destination apparatus comprises a measure of the signal-to-interference plus noise ratio (SINR) of a communication signal received at the destination apparatus or the intermediate apparatus respectively.

Preferably, said imbalance detection means comprises a pathloss updating means operable, following receipt of said indicators from said base station and said intermediate apparatus, or following a change in one or both of said indicators, to determine a measure of the pathloss experienced by a communication signal being transmitted between the source apparatus and the intermediate apparatus, and between the intermediate apparatus and the base station. A measure of the pathloss experienced by a communication signal being transmitted between the source apparatus and the intermediate apparatus may preferably be determined from a measure of the transmit power of the source apparatus when that communication signal was transmitted. A measure of the pathloss experienced by a communication signal being transmitted between the intermediate apparatus and the base station may preferably be obtained from a measure of the transmit power of the intermediate apparatus when that communication signal was transmitted. The intermediate apparatus may be operable to transmit a transmit power indicator which is indicative of a measure of a current transmit power of the intermediate apparatus to the pathloss updating means for use determining the pathloss between the intermediate apparatus and the destination apparatus. Alternatively, the measure of the transmit power of the intermediate apparatus may be determined from i) a measure of the transmit power of the intermediate apparatus at an initial time and ii) knowledge of changes in the transmit power of the intermediate apparatus which have occurred since said initial time.

The intermediate apparatus preferably comprises a receiver operable to receive the signal transmitted by the source apparatus; and a transmitter operable to transmit the received signal, or a signal derived therefrom, to the destination apparatus. Duplexing of signals to separate communication signals received by the intermediate apparatus from communication signals transmitted by the intermediate apparatus may be Frequency Division Duplex (FDD) or Time Division Duplex (TDD). One or more of the intermediate apparatuses may preferably comprise a so-called relay node (RN) or relay-station (RS). A relay node has the capability of receiving a signal for which it is not the intended final destination and then transmitting the signal on to another node such that it progress towards the intended destination. A relay node may be of the regenerative type, where the received signal is decoded to the bit level, making a hard decision. If the received packet is found to be in error then retransmission is requested, hence the RN incorporates ARQ or H-ARQ. ARQ or H-ARQ is a receiver technique for managing retransmission request and subsequent reception of retransmitted signals. Once the packet is successfully received, it is then scheduled for retransmission towards the destination, based on any radio resource management strategies incorporated into the RN. Alternatively a relay node may be of the non-regenerative type, whereby data is amplified at the relay node and the signal is forwarded to the next apparatus or node. It is envisaged that the function of an intermediate apparatus or relay node may be provided by a mobile phone, or other user equipment.

Preferably, the control means is operable, following a calculation of a new transmit power for the intermediate apparatus by the first calculation means, to determine if the new transmit power of the intermediate apparatus is greater than a maximum transmit power of the intermediate apparatus. This is determined with reference to the maximum transmit power of the intermediate apparatus. Preferably, if it is determined by the control means that the new transmit power is greater than the maximum transmit power, the first calculation means calculates a second new transmit power for the intermediate apparatus which does not exceed the maximum transmit power of the intermediate apparatus.

Furthermore, in the case where the control means receives a request for a change in the transmit power of the intermediate apparatus, the control means may preferably be operable to receive an input signal which allows the control means to determine if the request is due to a change in a variation from target indicator derived by the base station. If it is determined that the request is due to a change in the variation from target indicator derived by the base station, the first calculation means is further operable to calculate a new transmit power for the source apparatus, based on the new transmit power calculated for the intermediate apparatus, to thereby tend to substantially prevent an imbalance between a measure of the quality of a communication signal received at the intermediate apparatus and a measure of the quality of a communication signal received at the base station from arising. Following a calculation of a new transmit power for the source apparatus, the control means is preferably operable to determine if said new transmit power for the source apparatus is greater than a maximum transmit power for the source apparatus. If it is determined by the control means that the new transmit power is greater than the maximum transmit power of the source apparatus, the first calculation means calculates a second new transmit power for the source apparatus which does not exceed said maximum. The first calculation means is advantageously operable, following the calculation of a second new transmit power for the source apparatus, to calculate a second new transmit power for the intermediate apparatus which will tend to prevent an imbalance between a measure of the quality of a communication signal received at the base station and a measure of the quality of a communication signal received at the intermediate apparatus from arising.

It should be appreciated that embodiments of the first aspect of the present invention, which seek to detect a change in an indicator derived by the base station, may or may not seek to balance, or prevent an imbalance, between that indicator and an indicator of the same type derived by the intermediate apparatus. Furthermore, in the case where a change in an indicator of the variation from target SINR set by the base station is detected as a result of the target SINR changing (whilst the SINR at the destination remains constant), no imbalance will exist between the indicators of SINR derived by the base station and the intermediate apparatus (assuming the system was in balance prior to the change in target at the destination apparatus), and the control means will tend to calculate the adjustment required in the transmit power of both the intermediate apparatus and the source apparatus which will prevent an imbalance in SINR from arising.

The first and second aspects of the present invention will each tend to reduce or prevent an imbalance which arises or may arise, as the case may be, under different circumstances. For example, the situation may arise where the pathloss between the intermediate apparatus and the base station changes or the target of the base station may change. Both of these events leads to a change in the indicator derived by the base station and can advantageously be addressed by embodiments of the first aspect of the present invention. Both of these events are advantageously dealt with by the first aspect of the present invention which is triggered by detection of a change in the indicator derived by the base station. Preferably, a communication system embodying the first aspect of the present invention will comprise a deviation means which monitors the, or one of the, indicators of the destination apparatus at all times. Thus, any deviation in the indicator derived by the destination apparatus, can be detected quickly.

The first aspect alone may be sufficient to restore balance across a multi-hop system following a change in the pathloss between the intermediate apparatus and the base station. In many instances, the first aspect alone may be sufficient to maintain a balance across the multi-hop system. However, as discussed above, if the pathloss between the source apparatus and the intermediate apparatus changes (which may be due to a change in the position of the source apparatus and/or the intermediate apparatus and/or a change in environmental conditions), this must be dealt with by embodiments of the second aspect of the present invention. Thus, it is preferable to provide a communication system which embodies both the first and second aspect of the present invention. In this case, the imbalance detection of the second aspect of the present invention is performed periodically. Thus, according to a preferred embodiment of the first aspect of the present invention said intermediate apparatus comprises indicator derivation means operable to derive one or more indicators of the quality of a communication signal received at the base station, wherein said intermediate apparatus and said base station are operable to transmit said indicators to said control means, the control means further comprising:
    i) imbalance detection means operable to detect an imbalance between the indicators of the base station and the intermediate apparatus; and
    ii) second calculation means operable, following detection of such an imbalance, to calculate a new transmit power for the source apparatus which will tend to substantially reduce said imbalance.

The situation may arise where a change in the target of the base station is accommodated by a substantially simultaneous change in the pathloss between the intermediate apparatus and the base station. Thus, in the case where the indicator deviation detection means of the first aspect of the present invention is provided in the base station such that the base station is operable to transmit a request to the control means for a change in the transmit power of the intermediate apparatus, no request for a change in transmit power of the intermediate apparatus will be generated by the base station if this situation does arise. This will lead to an imbalance in the system which will go un-corrected by the first aspect of the present invention, since the new target of the base station will have been met (inadvertently) but no corresponding change will have been made to the transmit power of the source apparatus. This, relatively rare, situation can also be handled by a communication system which embodies both the first and second aspect of the present invention since the change in the measure of the pathloss experienced between the intermediate apparatus and the base station will be detected by the pathloss updating means. The second calculation means is then operable to calculate the change in the transmit power of the source apparatus that is required to in order to tend to balance a measure of the quality of a communication signal received at the intermediate apparatus and a measure of the quality of a communication signal received at the base station.

According to an embodiment of the first aspect of the present invention there is provided a method of controlling the transmit power of one or more apparatus operable to transmit a communication signal in a multi-hop communication system, the communication system comprising a source apparatus, a base station and at least one intermediate apparatus, the source apparatus being operable to transmit a communication signal, via the or each intermediate apparatus, to the base station, the method comprising the steps of:

i) deriving one or more indicators of a quality of a communication signal received at the base station;

ii) detecting a deviation in the, or one of the, said indicators;

ii) calculating, following the detection of such a change, a new transmit power for the intermediate apparatus, or a new transmit power for the intermediate apparatus and the source apparatus, which will tend to: a) substantially reduce an imbalance between a measure of the quality of a communication signal received at the intermediate apparatus and a measure of the quality of a communication signal received at the base station; or b) substantially prevent said imbalance from arising.

According to an embodiment of the second aspect of the present invention there is provided a method of controlling the transmit power of one or more apparatus which is operable to transmit a communication signal in a multi-hop communication system, the communication system comprising a source apparatus, a base station and at least one intermediate apparatus, the source apparatus being operable to transmit a communication signal, via the or each intermediate apparatus, to the base station, the method comprising the steps of:

i) deriving, at each of the base station and the intermediate apparatus, one or more indicators of the quality of communication signal received at the base station, or at the intermediate apparatus;

ii) detecting an imbalance between one said indicator derived by the base station and one said indicator derived by the intermediate apparatus; and ii) calculating, following the detection of such an imbalance, a new transmit power for the source apparatus, which will tend to substantially reduce said imbalance.

According to an embodiment of the first aspect of the present invention there is provided a base station operable to receive, via at least one intermediate apparatus, a communication signal transmitted by a source apparatus, the base station comprising:

i) indicator derivation means, operable to derive one or more indicators of the quality of a communication signal received at the base station; or ii) indicator deviation detection means, operable to detect a deviation in one said indicator derived by the indicator derivation means; and iii) control means comprising first calculation means operable, following detection of such a change, to calculate a new transmit power for the intermediate apparatus, or a new transmit power for the intermediate apparatus and the source apparatus, which will tend to: a) substantially reduce an imbalance between a measure a quality of a communication signal received at the intermediate apparatus and a measure of the quality of a communication signal received at the base station; or b) substantially prevent said imbalance from arising.

Preferably, the base station is operable to receive an input signal which allows the control means to determine if the request is due to a deviation in the variation from target indicator derived by the base station which arises due to a change in the target received signal quality set for the destination apparatus. Furthermore, the control means further comprises command means operable to issue a command to said intermediate apparatus and/or said source apparatus, commanding a change in the transmit power of the intermediate apparatus, and/or the transmit power of the source apparatus in accordance with the new transmit power calculated by the first calculation means.

Preferably, the base station further comprises indicator receiving means, operable to receive an indicator from the intermediate apparatus, the indicator being indicative of a quality of a communication signal received at the intermediate apparatus, the base station further comprising an imbalance detection means operable to detect an imbalance between one said indicator derived by the base station and one said indicator received from the intermediate apparatus; and wherein the control means comprises second calculation means operable, following detection of such an imbalance, to calculate a new transmit power for the source apparatus which will tend to substantially reduce said imbalance. Preferably, the imbalance detection means comprises a pathloss updating means operable to determine a measure of the pathloss experienced by a communication signal being transmitted between the source apparatus and the intermediate apparatus, and between the intermediate apparatus and the base station.

According to an embodiment of a second aspect of the present invention, there is provided a base station operable to receive via, at least one intermediate apparatus, communication signal transmitted from a source apparatus base station, the base station comprising:

i) indicator derivation means, operable to derive one or more indicators of a quality of a communication signal received at the base station;

ii) receiving means, operable to receive one or more indicators from the intermediate apparatus, the or each indicator being indicative of a quality of a communication signal received at the intermediate apparatus;

iii) imbalance detection means operable to detect an imbalance between one said indicator derived by the base station and one said indicator received from the intermediate apparatus; and iv) control means comprising second calculation means operable, following detection of such an imbalance, to calculate a new transmit power for the source apparatus which will tend to substantially reduce said imbalance.

Preferably, the imbalance detection means further comprises a pathloss updating means operable to determine a measure of the pathloss experienced by a communication signal being transmitted between the source apparatus and the intermediate apparatus, and between the intermediate apparatus and the base station. The control means preferably further comprises command means operable to issue a command to said source apparatus commanding a change in the transmit power of the source apparatus to change in accordance with the new transmit power calculated by the second calculation means.

Communication methods carried out in a base station embodying the present invention, an intermediate apparatus embodying the present invention or in a destination apparatus embodying the present invention are also provided.

Embodiments of the present invention are particularly useful multi-hop systems in which the position of the relay node is fixed. Furthermore, embodiments of the present invention advantageous in that either both regenerative and non-regenerative relays may be used. Furthermore, embodiments of the present invention advantageously enable centralised control of the setting of the transmit power to be maintained with minimal processing required in the relay station. This is beneficial to the operator as it keeps control located within a central entity making management of the network much simpler. Further, should the relay start to malfunction, then due to the fact control is located in the base station (or Node-B) then corrective measures are possible by the operator. Moreover, the fact that processing in the intermediate apparatus is kept to a minimum is advantageous in terms of reducing power consumption and thus maximise battery life, should the intermediate apparatus be a mobile or remote device.

The desired value may be the value of the indicator of the quality of a communication signal derived by the destination apparatus which is at, or close to, the target value set by the destination apparatus, and when the system is substantially balanced (i.e. a measure of a quality of a communication signal received at the destination apparatus is in balance with a measure of a quality of communication signal received at the, or each, intermediate apparatus). Thus, embodiments of the first aspect of the present invention may be advantageously used to maintain the quality of the communication signal received by the destination apparatus at, or near, the target value set by the destination apparatus. Thereafter, it may be necessary for embodiments of a second aspect of the present invention to optimise the systems ensuring a balance is achieved between the destination apparatus and the or each intermediate apparatus.

Thus, it should be appreciated that the indication deviation detection means may be used in a system which has already been balanced, or optimised. Thus, a deviation from the desired value, which may arise due to an event which results in a change in a measure of a quality of a communication signal at the destination apparatus will be detected, and the required change the resource allocated to the previous intermediate apparatus determined.

The required change in resource allocation will be calculated by the first calculation means. If the change in indicator is due to a change in target, the first calculation means will also be operable to calculate the new transmit power for the source apparatus that will tend to prevent an imbalance, due to a new target quality at the destination apparatus being satisfied, from arising. If the target has not changed, but the pathloss has changed such that the quality of the communication signal has altered, the calculation means only need calculate a new transmit power for the intermediate apparatus in order for a balance to be maintained. Changes in pathloss between the source apparatus and the intermediate apparatus, which lead to a change in the RSS/SINR at the intermediate apparatus, must be dealt with by systems/methods which embody the second aspect of the present invention, or which embody both the first and second aspects of the present invention.

Embodiments of the present invention may be implemented within a wireless communication system employing any multiple access technique, including but not limited to: frequency division multiple access (FDMA), time division multiple access (TDMA) code division multiple access (CDMA) and orthogonal frequency division multiple access (OFDMA). In the case of a CDMA system, in which all transmissions occur in the same frequency band and each transmission is assigned a unique channelisation code, the Gp factor represents the spreading factor or length of the code used to spread the transmitted signal otherwise known as the processing gain. In the case of orthogonal spreading codes, up to Gp channels are available for simultaneous transmission.

The actual calculation to be performed by the first and second calculation means may be derived in a number of possible ways. One possible derivation, which is based on a consideration of the SINR at each of the receiving elements in a multi-hop network, and can be developed specifically for the case of uplink transmitting calculating the optimal transmit power of the transmitting elements comprised in a multi-hope network for various deployment scenarios. The skilled person will appreciate that alternative solutions may be derived from consideration of other types of measures of the quality of a communication signal at the receivers of a multi-hop network and the underlying principal of the present invention that these measures should be balanced.

It should be appreciated that the term "user equipment" encompasses any device which is operable for use in a wireless communication system. Furthermore, although the present invention has been described primarily with reference to terminology employed in presently known technology, it is intended that the embodiments of the present invention may be advantageously applied in any wireless communication systems which facilitates the transmission of a communication signal between a source and destination, via an intermediate apparatus.

In any of the above aspects, the various features may be implemented in hardware, or as software modules running on one or more processors or as a combination of these. The invention also provides operating programs and (computer programs and computer program products) for carrying out any of the methods described herein, and computer readable media having stored thereon programs for carrying out any of the methods described herein. A program embodying the invention may be stored on a computer-readable medium, or it could, for example, be in the form of a signal such as a downloadable data signal provided from an Internet web site, or it could be in any other form.

For a better understanding of the present invention and to show how the same may be carried into effect, reference will now be made, by way of example, to the accompanying drawings in which.

Figure 2A:
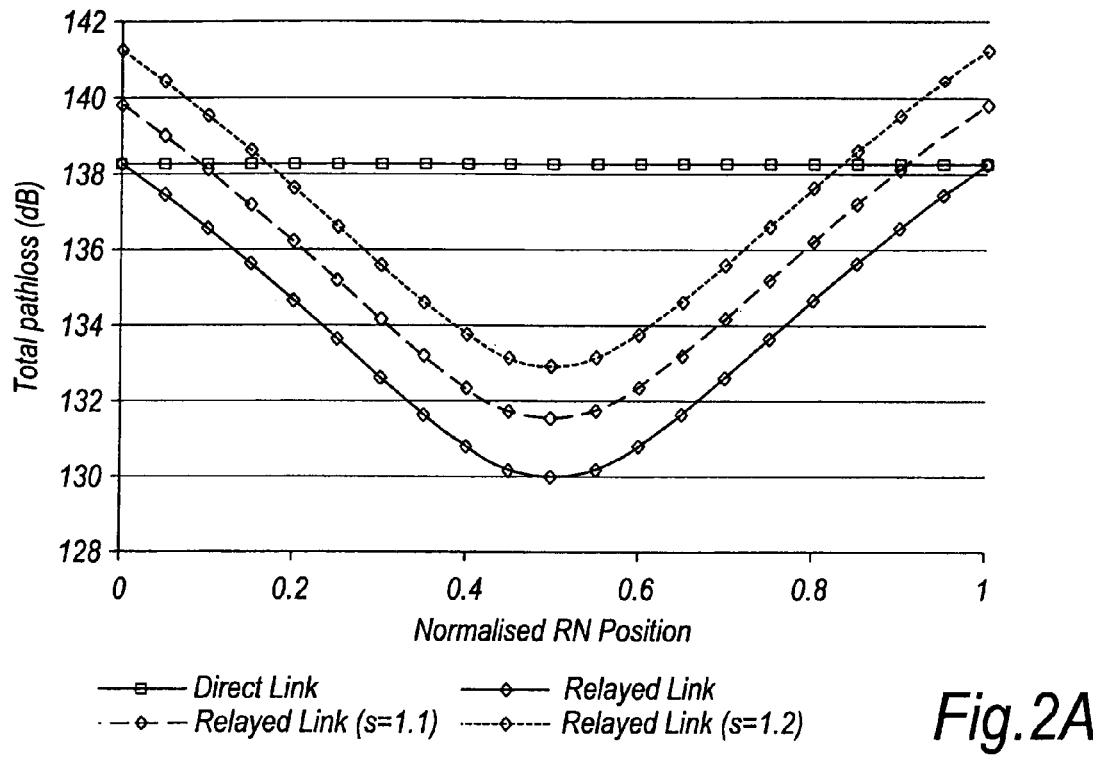
Figure 2B:
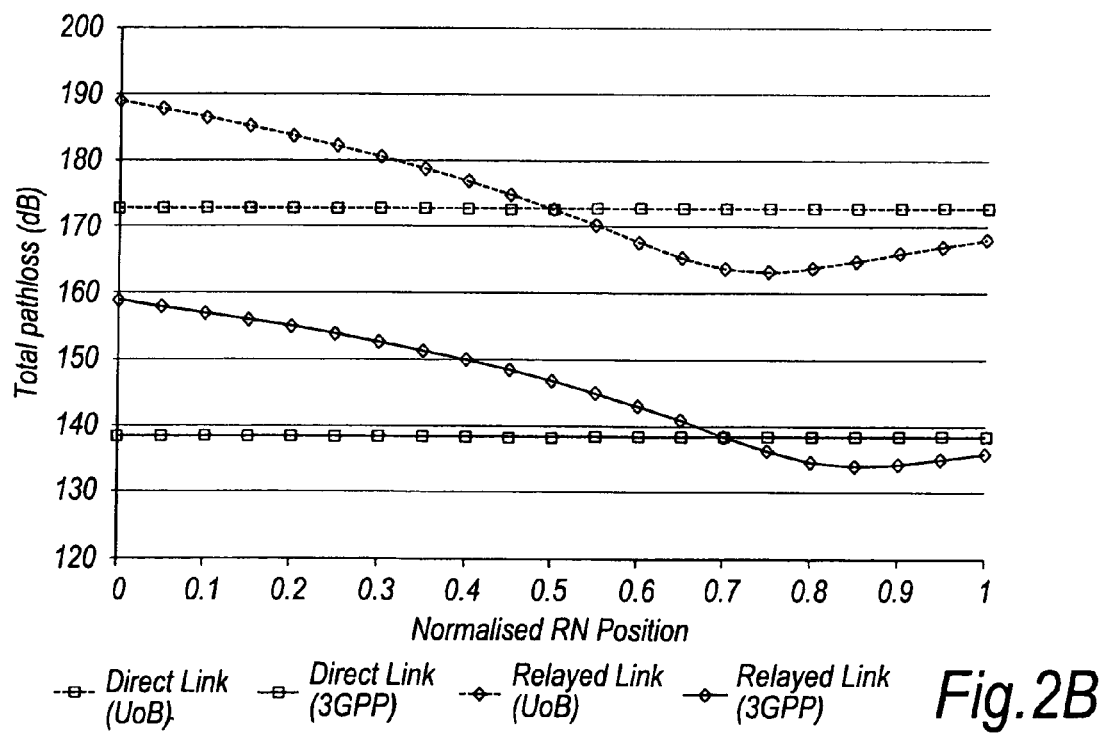
Figure 3:
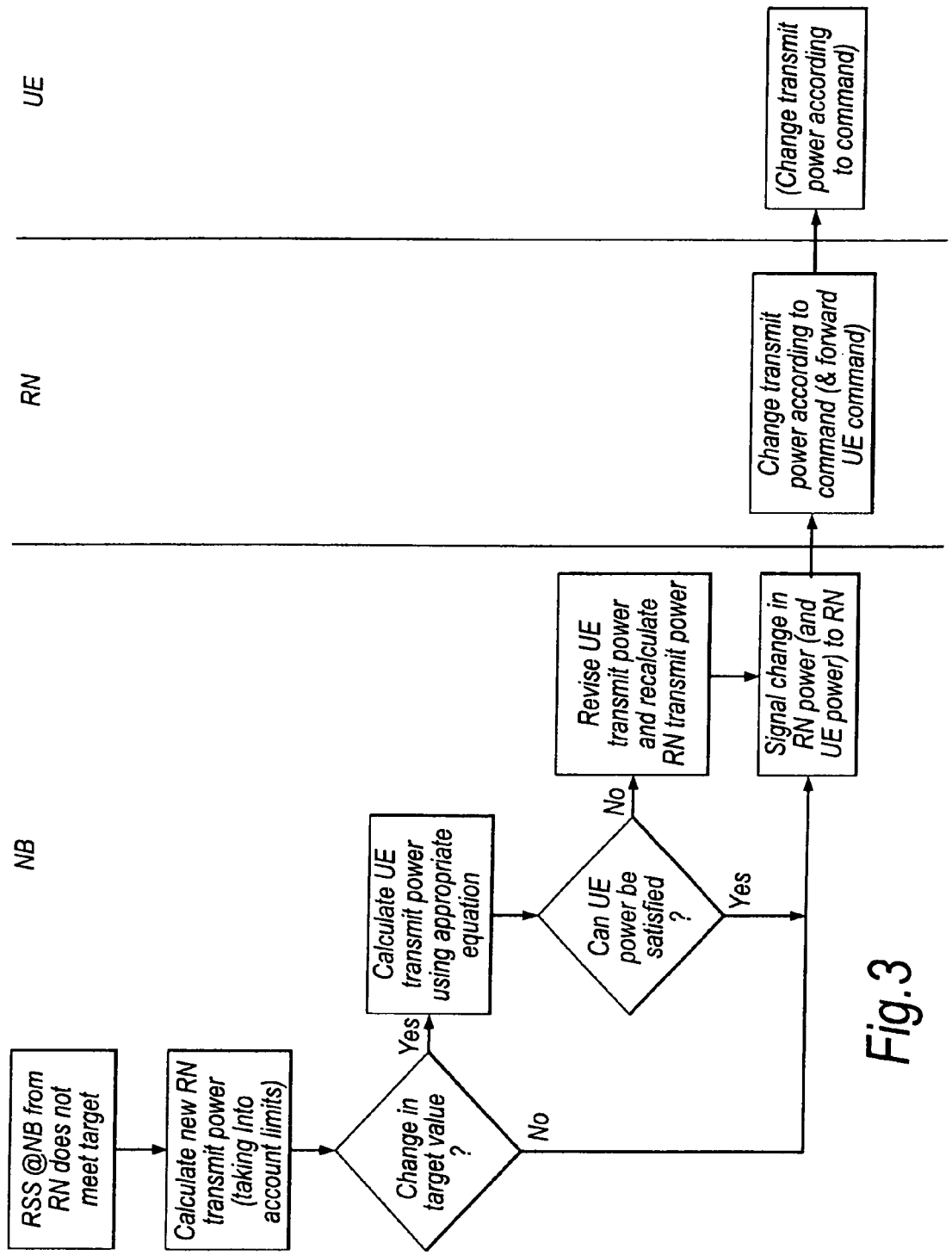
Figure 4:
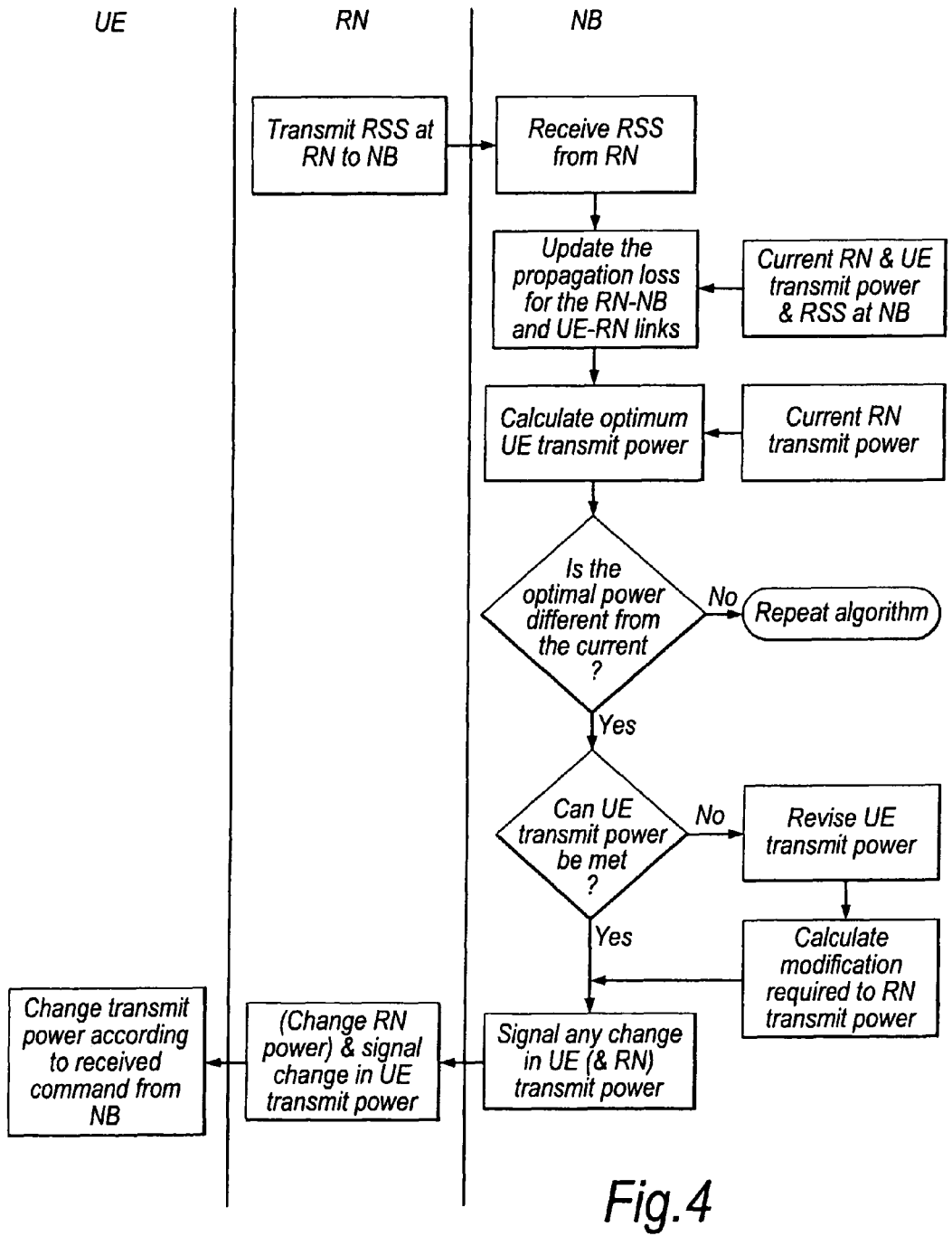
Figure 5A:
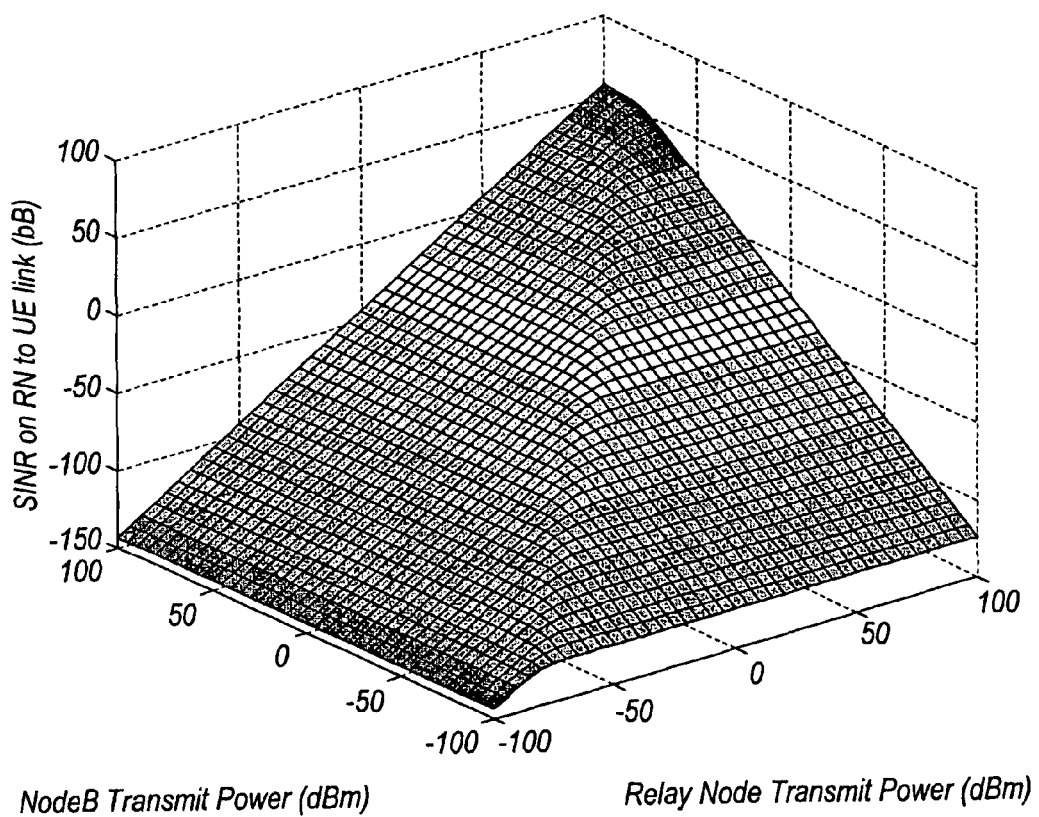
Figure 5B:
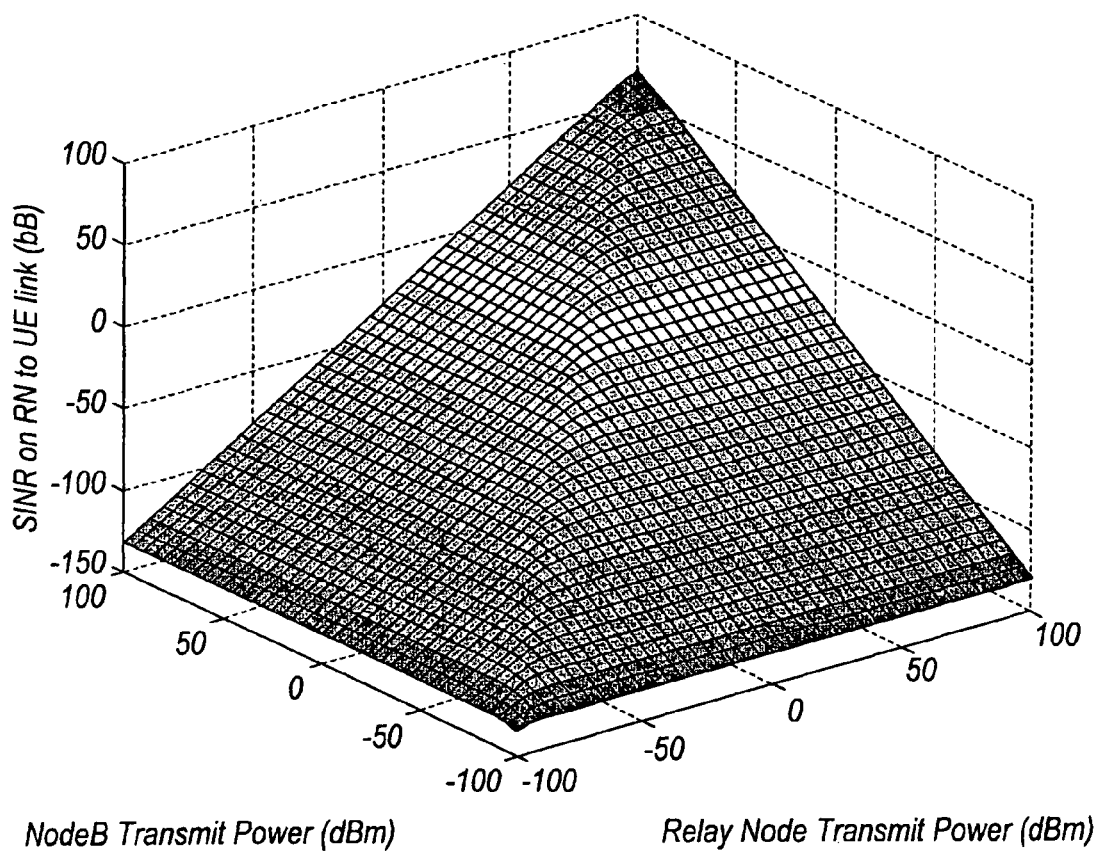
Figure 6A:
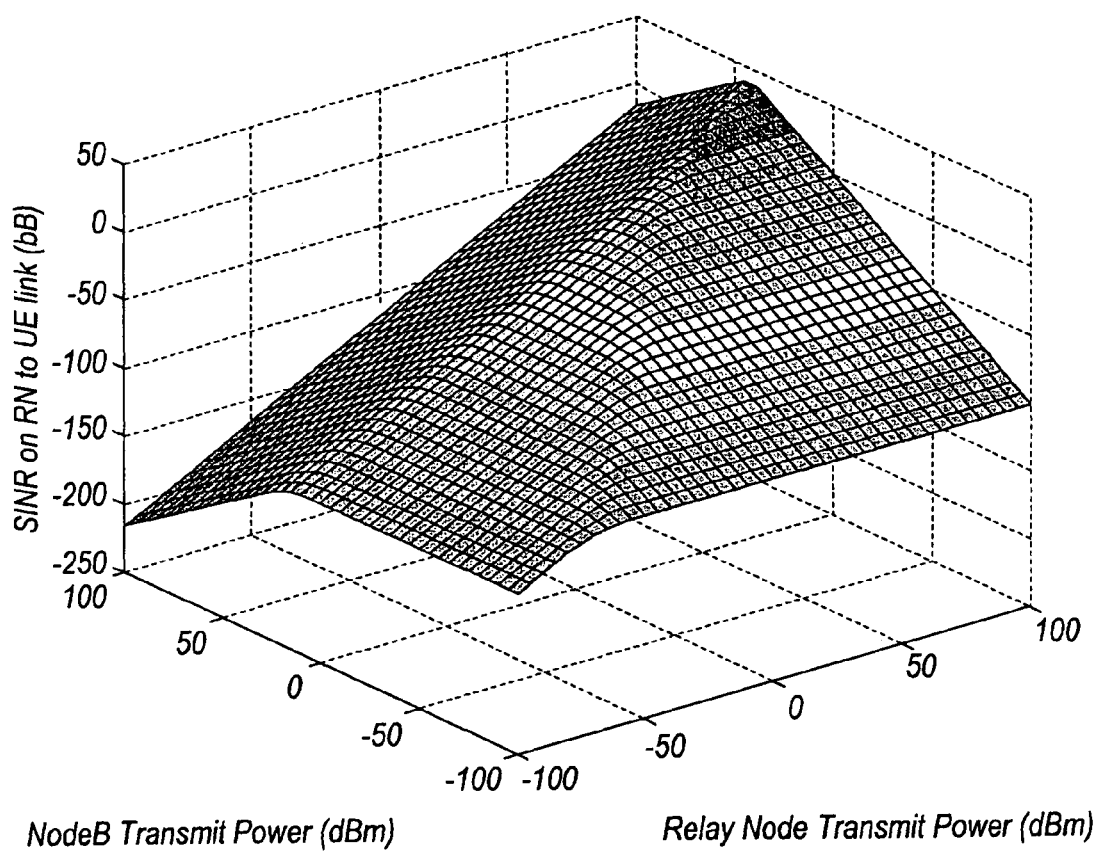
Figure 6B:
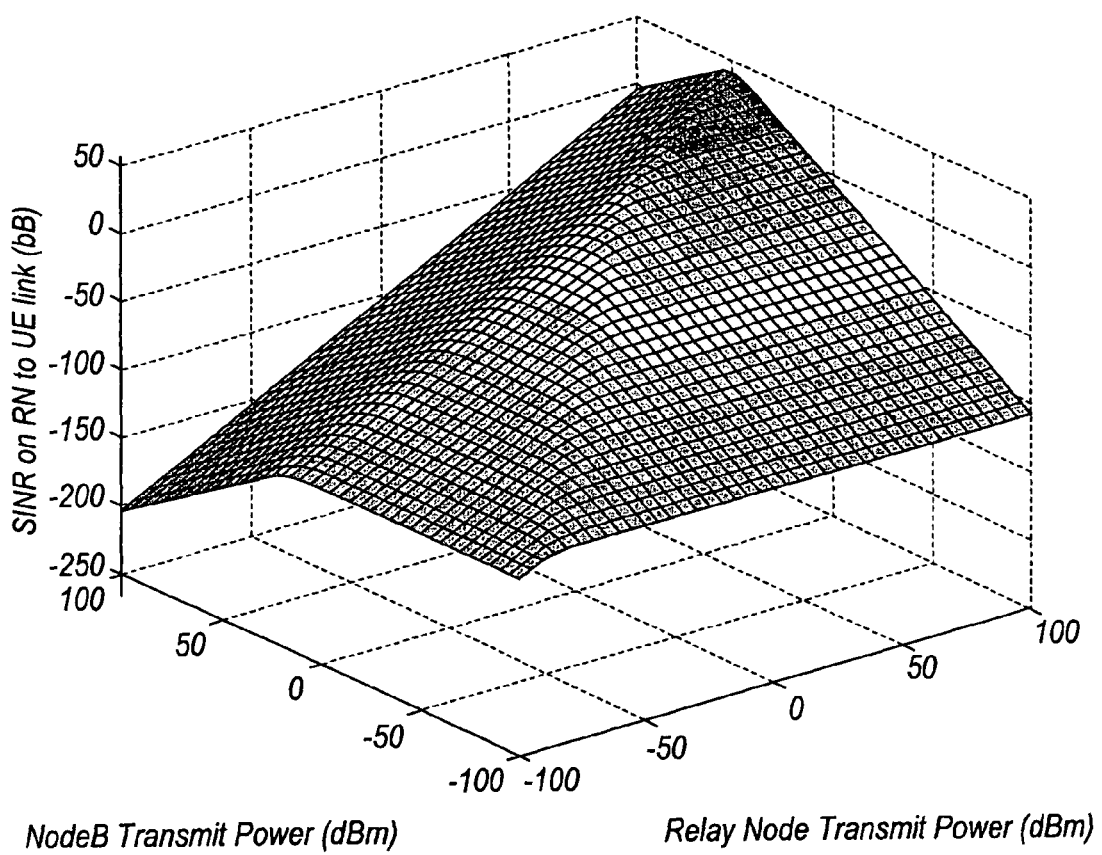
Figure 7A:
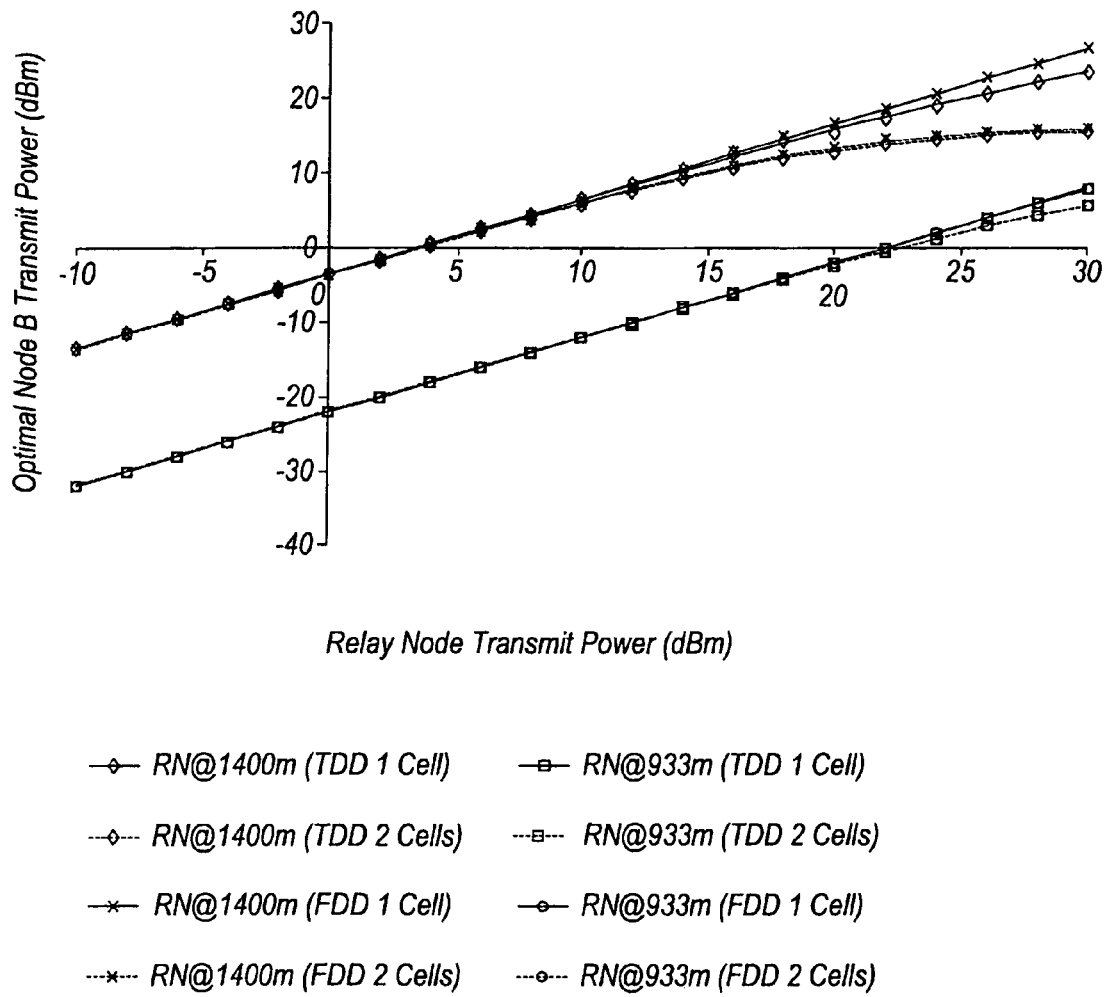
Figure 7B:
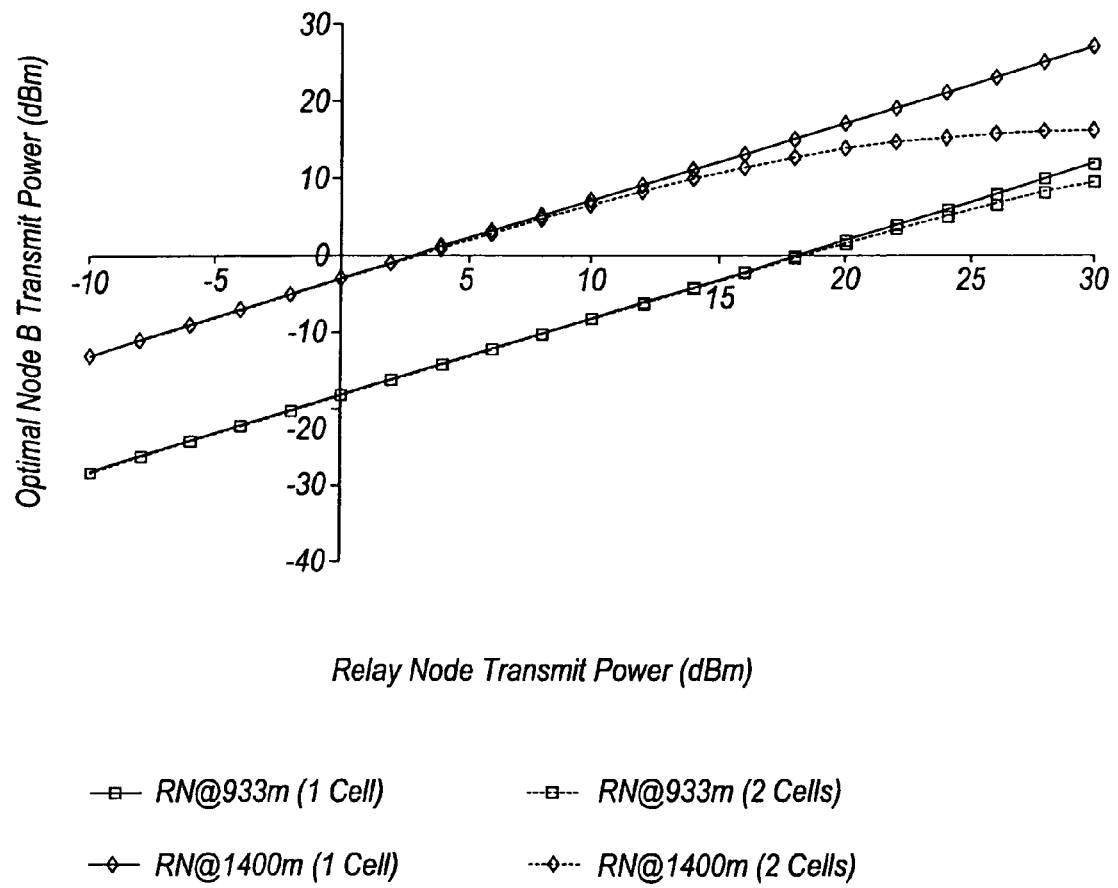
Figure 9:
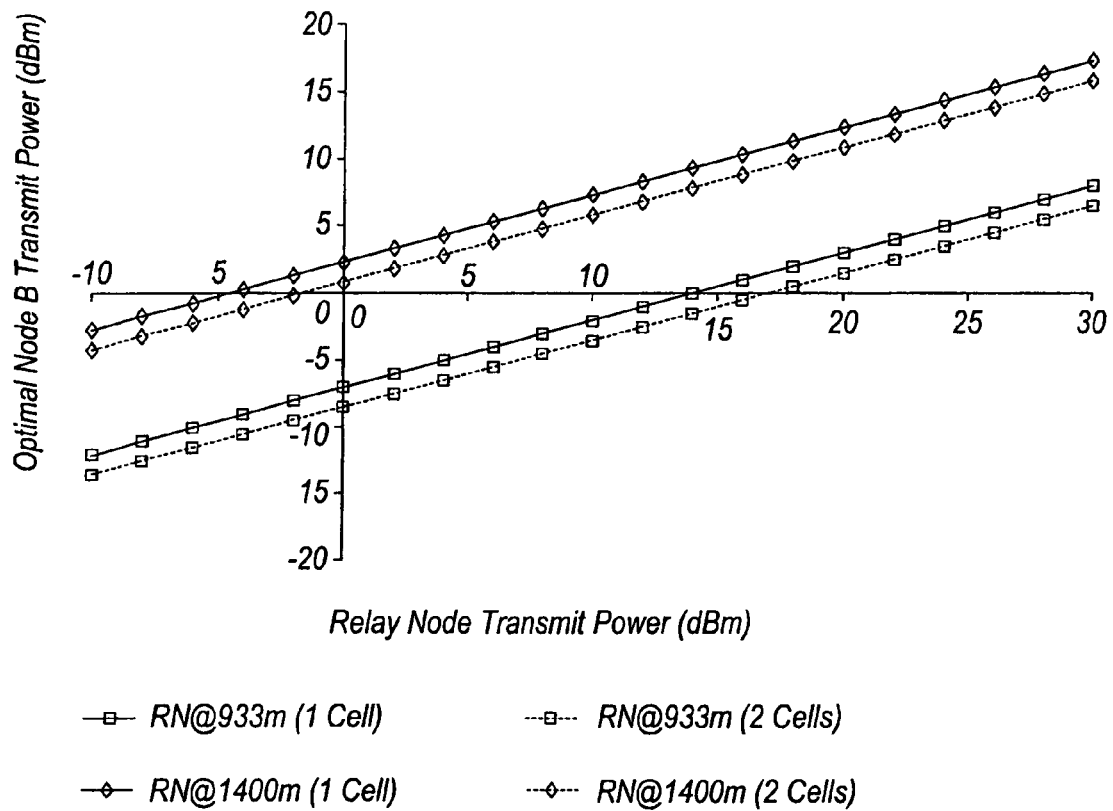

FIGS. 2A and 2B each show a graphical representation of the theoretical gain that may be achieved by a multi-hop communication system based on pathloss equation (A);

FIG. 3 illustrates an algorithm embodying the first aspect of the present invention;

FIG. 4 illustrates an algorithm embodying the second aspect of the present invention;

FIG. 5 illustrates the relationship between source transmit power and intermediate transmit power in the case of a multi-hop communication system having a non-regenerative relay node and using an FDD duplexing technique;

FIG. 6 illustrates the relationship between source transmit power and intermediate transmit power in the case of a multi-hop communication system having a non-regenerative relay node and using a TDD duplexing technique;

FIGS. 7A and 7B illustrate the optimal NB transmit power as a function of RN transmit power;

FIG. 8 shows a graphical illustration of the variation in the average gain in throughput observed by users of a multi-hop system as compared to that observed for a single hop system; and FIG. 9 illustrate the optimal NB transmit power as a function of RN transmit power where it is assumed that the communication link between the source and destination apparatus has a 3 dB gain compared with the shorter multi-hop links.

An example of an algorithm which implements an embodiment of the first aspect of the present invention will now be described with reference to FIG. 3, in which the source apparatus comprises a user equipment (UE), the intermediate apparatus comprises a relay node (RN), which is of the regenerative type, and the destination apparatus comprises a base station (NB). The base station continually monitors the RSS and derives indicators of the RSS and the variation from target RSS. The base station is provided with indicator deviation detection means for detecting a change in one or both of these indicators. The base station is also provided with a control means having a first calculation means according to an embodiment of the present invention.

In order to enable an explicit calculation of a new RN transmit power following a change in an indicator derived by the NB, the control means in the NB requires knowledge of the current RN transmit power. Two techniques for obtaining this information are available: 1) The NB has knowledge of the initial transmit power of the RN as well as the maximum; this knowledge is either inherent or signalled when the RN connects to the NB. The NB then tracks the RN transmit power as commands to change it are issued or 2) The RN reports the current transmit power to the NB preventing the need for tracking in the NB. This algorithm assumes the first technique is used since it benefits from lower signalling complexity.

The details of the algorithm are summarised as follows:

Uplink Algorithm 1: Part 1
Trigger: Request for change in RN transmit power in NB

| Algorithm Input | Required by | Origin |
| --- | --- | --- |
| Request for change in RN Transmit Power | NB | Derived in NB |
| RN Transmit Power | NB | Tracked/calculated in the NB |
| UE Transmit Power | NB | Tracked/calculated in the NB |

| Algorithm Output | Derivation | Destination & Signalling Requirement |
| --- | --- | --- |
| New RN transmit power | Explicit calculation | Relative change in RN transmit power signalled to RN |
| New UE transmit power | Explicit calculation | Relative change in UE transmit power signalled to UE via RN |

The following sequence takes place following detection of a change in an indicator derived by the base station in order to i) substantially reduce an imbalance between a measure of the quality of a communication signal received at the intermediate apparatus and a measure of the quality of a communication signal received at the base station; or (NB) ii) to substantially prevent said imbalance from arising.
1. The control means of the NB calculates a new transmit power for the RN taking into account the transmit power limits of the RN;
2a. If the change detected by the indicator deviation detection means of the base station is a result of the pathloss changing between the intermediate apparatus and the base station (such that the indicator of SINR will change), the control means of the base station transmits a command to the RN commanding a change in the transmit power of the RN; or
2b. If the change detected by the indicator deviation detection means of the base station is a result of a change in the target quality indicator set for the base station (such that the indicator of variation from target RSS will change) then:
  i) the first calculation means also calculates a new transmit power for the source apparatus (UE) which corresponds to the calculated new transmit power for the RN. In the case of a CDMA system, the first calculation means modifies the calculated value of the new transmit power of the source apparatus so as to minimise the so-called "near-far" effect. Thus, the transmit power of the UE may be increased or decreased from the optimal value. The modification will depend on the requirements of the operator of the system since the effect of improper power balancing reduction in performance gain from multi-hopping must be weighted against a reduction in performance at a receiver in a multi-user scenario due to all the received signal levels not being equal.
  ii) the NB checks that the adjustment in the transmit power of the UE needed to meet the calculated new transmit power can be met, taking into account the maximum transmit power of the UE. If it is determined that the calculated new transmit power of the UE cannot be met, the first calculation means calculates a revised new transmit power for both the RN and the UE. In the case of a CDMA system, the first calculation means modifies the calculated value of the new transmit power of the source apparatus so as to minimise the so-called "near-far" effect; and
  iii) the control means issues a command to the RN and the UE commanding a change in the transmit power of the RN and the UE in accordance with the new transmit powers calculated by the first calculation means.

The algorithm described above will manage the case of the propagation loss varying between the RN and the NB and the case of the NB modifying its target RSS. In order to handle the case of the propagation loss varying between the UE and the RN, and the case that both the target in the NB and the propagation loss between the RN and NB varies, such that the above algorithm will not operate to determine the new transmit power for the UE, an algorithm which implements an embodiment of the second aspect of the present invention operates periodically as discussed below.

The details of the algorithm may be summarised as follows:

Uplink Algorithm 1: Part 2
Trigger: Periodically executed in NB

| Algorithm Input | Required by | Origin |
| --- | --- | --- |
| RSS at RN | NB | Signalled from RN |
| RSS at NB | NB | Monitored in the NB |
| RN Transmit Power | NB | Tracked/calculated in the NB |
| UE Transmit Power | NB | Tracked/calculated in the NB |

| Algorithm Output | Derivation | Destination & Signalling Requirement |
| --- | --- | --- |
| New UE transmit power | Explicit calculation | Relative change in UE power signalled to UE via RN |
| New RN transmit power | Explicit calculation | Relative change in RN power signalled to RN |
| Propagation losses | Explicit calculation | Derived from difference between Tx and Rx power. Used in NB. |

This algorithm may be advantageously executed in addition to the algorithm discussed above with reference to FIG. 4. Alternatively, it is also possible for the algorithm described with reference to FIG. 4, or the following algorithm, to be implemented separately in a wireless multi-hop communication system.

The algorithm assumes that an indicator of the quality of a communication signal (RSS) derived by the RN is reported to the NB. The NB monitors the indicator derived by the RN and by an indicator derivation means of the NB, in order to facilitate calculation of the propagation loss across the two links by the second calculation means. The NB requires knowledge of the RN transmit power and the UE transmit power and this knowledge may be obtained by one of two techniques.: 1) The NB has knowledge of the initial transmit power of the RN/UE as well as the maximum; this knowledge is either inherent or signalled when the RN/UE connects to the NB. The NB then tracks the RN/UE transmit power as commands to change it are issued or 2) The RN/UE reports the current transmit power to the NB preventing the need for tracking in the NB. This algorithm assumes the first technique is used since it benefits from lower signalling complexity.

1. The NB monitors the indicators of the received signal strength derived by both the NB and RN. Using this in conjunction with the knowledge of the RN and UE transmit power it updates the propagation loss for the UE-RN and RN-NB links;
2. If a change in either the UE-RN or RN-NB propagation loss is detected then the updated propagation loss is used by the second calculation means, in conjunction with the knowledge of the RN transmit power, to calculate the optimal UE transmit power. In the case of a CDMA system, the first calculation means modifies the calculated value of the new transmit power of the source apparatus so as to minimise the so-called "near-far" effect. If no change in propagation loss is detected then the current iteration of the algorithm terminates;
3. The NB checks whether the calculated optimal transmit power differs from the current UE transmit power.
3a. If it does not differ, then the current iteration of the algorithm terminates; or
3b. If it does differ, then:
   i) if the calculated new UE transmit power can be met (i.e. the maximum transmit power of the UE will not be exceeded) then NB signals a command to the UE for the UE to adjust its transmit power in accordance with the new transmit power calculated by the second calculation means; or
   ii) if the calculated UE transmit power cannot be met then the UE transmit power is modified to one that can. The second calculation means then calculates the new RN transmit power that ensures optimal balance. The NB then signals a command to the UE and the RN commanding an adjustment in transmit power in accordance with the new transmit powers calculated by the second calculation means.

Theoretical Analysis

The following theoretical analysis derives possible solutions for calculating the optimal transmit power of the transmitting elements comprised in a multi-hop network for various deployment scenarios. Whilst the equations are developed solely for the case of the connections that form the downlink in a multi-hop network, it is straightforward to adapt the equations derived for the case of the uplink. Such an adaptation is achieved by adopting the same methodology used to develop the expressions for the received SINR at the receiving nodes, where the transmitting nodes are now the UE and the RN and the receiving nodes are now the NB and RN. Once expressions for the SINR received at the RN and NB are arrived at, the same methodology can be employed for each deployment scenario in order to determine the optimal transmit power setting of the UE and RN. For each deployment scenario, theoretical solutions are obtained assuming a single-cell model and a two-cell model. In the case of a two cell model, it is assumed that the deployment in both cells is identical and that the transmit powers on the bas station (BS) and the intermediate apparatus (I) are the same. It is also assumed that where appropriate $P_{tx\_tot,RN} = G_p P_{tx,RN}$ and $P_{tx\_tot,NB} = G_p P_{tx,NB}$ and that for the case of TDD both RN's transmit at the same time. This in effect generates the worse case scenario for two cells.

Theoretical solutions may be evolved from a consideration of the signal-to-interference plus noise ratio (SINR) experienced by the receiving nodes in a multi-hope system (i.e. the or each intermediate apparatus (I) and the destination apparatus (D)). The SINR at a particular node is a measure of the quality of a communication signal received by that node and is a ratio of the received strength of the desired signal to the received signal strength of the undesired signals (noise and interference).

As previously discussed, the considerations required for noise and interference depend on the duplexing method used to separate signal received at an intermediate apparatus from those transmitted from an intermediate apparatus, the characteristics of the intermediate apparatus and also the level of inter-cell interference which is taken into account (i.e. interference from neighbouring cells).

The following equation represents the SINR of a communication signal sent from an intermediate apparatus to a destination apparatus for all scenarios, where different terms may be ignored depending upon the type of intermediate apparatus (e.g. non-regenerative or regenerative) and the duplexing method:

$$SINR_{RN-UE} = \frac{G_p P_{tx,RN}}{L_{RN-UE}\left(N + \frac{P_{tx,RN}}{L_{RN-UE} SINR_{NB-RN}} + \frac{P_{tx\_tot,NB}}{L_{NB-UE}}\right)}$$

For the case of FDD instead of TDD then the third term in the bracket is removed and for the case of regenerative instead of non-regenerative the second term in the bracket is removed.

Figure 1A:
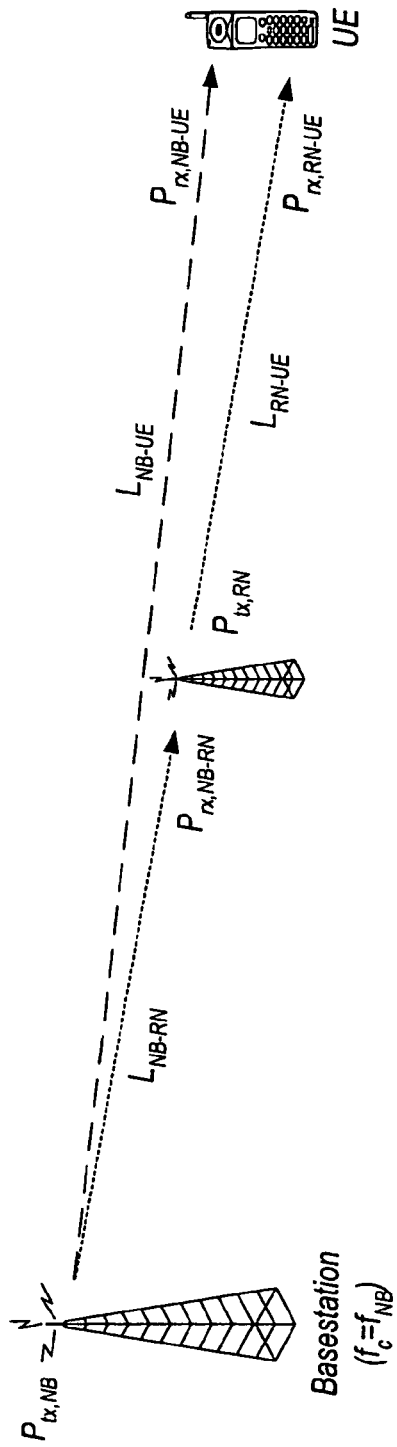
FIG. 1A illustrates a single cell/relay model of a wireless communication system.
Figure 1B:
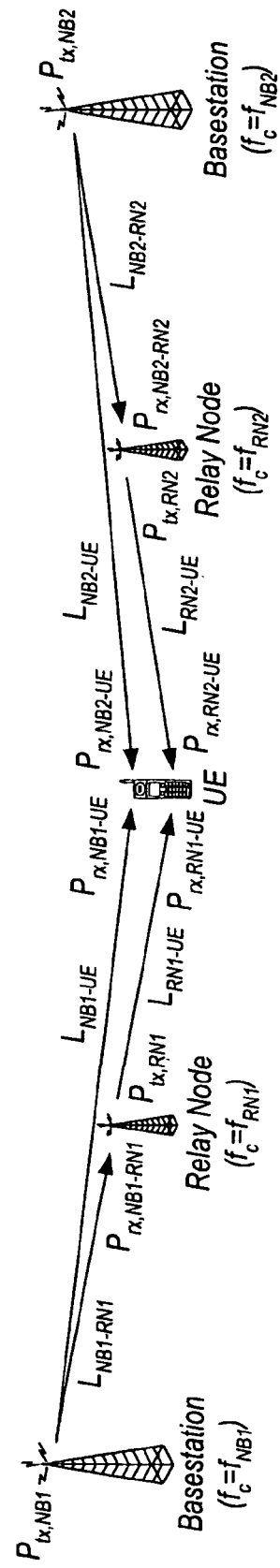
FIG. 1B illustrates a two cell/relay model of a wireless communication system.

In the case of a two-cell model as illustrated in FIG. 1B, this becomes:

$$SINR_{RN-UE} = \frac{(G_p P_{tx,RN1})}{L_{RN1-UE}\left(N + \frac{P_{tx,RN1}}{L_{RN1-UE} SINR_{NB1-RN1}} + \frac{P_{tx\_tot,NB1}}{L_{NB1-UE}} + \frac{P_{tx\_tot,NB2}}{L_{NB2-UE}} + \frac{P_{tx\_tot,RN2}}{L_{RN2-UE}}\right)}$$

The first three terms in the bracket in (2) are the same as those in (1). The additional last two terms originate from the interference experienced from the neighbouring co-channel NB and RN respectively. Obviously if the neighbouring cell employs a different frequency or uses a different timeslot for relay transmission then the terms needed to model this interference will vary. It should be appreciated that these equations can be extended to a three-cell model or more for a higher level of accuracy.

Considering now the various possible deployment scenarios in turn, for the case of DL transmissions transmitted between a base-station or node-B (NB), via an intermediate relay node (RN) to a destination user equipment (UE).

1A. Regenerative Relay with FDD—Single-Cell Model as Illustrated in FIG. 1A

In this case, the SINR at a destination UE which is connected to an intermediate RN is given by:

$$SINR_{RN-UE} = \frac{G_p P_{tx,RN}}{L_{RN-UE} N} \quad (1)$$

Where GP is the processing gain, $P_{tx,RN}$ is the transmit power on the channel of interest at the RN, $L_{RN-UE}$ is the propagation loss on the NB to RN link and N is the noise. Note this assumes that no intra-cell interference exists.

The SINR at an intermediate RN which is operable to receive signals from the NB is given by:

$$SINR_{NB-RN} = \frac{G_p P_{tx,NB}}{L_{NB-RN} N} \qquad (2)$$

Where $P_{tx,NB}$ is the transmit power on the channel of interest at the NB and $L_{NB-RN}$ is the propagation loss on the RN to UE link. Again, it is assumed that no intra-cell interference exists.

The overall throughput across the multi-hop link will be limited by the lower of the two SINR values as this will limit the rate at which data can be transmitted to that entity. Any increase in transmit power that causes an SINR imbalance will not improve the performance of the multi-hop system; it will simply result in wasted energy and an increase in interference to any co-channel users.

Thus, assuming that the receiver at the intermediate RN and the receiver at the destination UE perform the same, then it follows that the transmit power at the NB and RN should be set such that the SINR at the RN and UE is the same. Using this criterion for setting the ratio of the transmit powers, it follows that the ratio is given by:

$$\frac{P_{tx,NB}}{P_{tx,RN}} = \frac{L_{NB-RN}}{L_{RN-UE}} = \frac{b_1 s_1^{n_1}}{b_2 s_2^{n_2}} \qquad (3)$$

Where $b_1$ and $n_1$ are the pathloss parameters for the NB to RN link which is $s_1$ in length and $b_2$, $n_2$ and $s_2$ are associated with the RN to UE link. Thus using equation (3) it is possible to find either transmit power given the other.

1B. Regenerative Relay with FDD—Two Cell Model as Shown in FIG. 1B

In this case, transmit power equations may be derived taking into account interference caused by transmissions arising in the other cell.

In this case the SINR at a destination UE that is operable to receive signals from an intermediate RN is now:

$$SINR_{RN-UE} = \frac{G_p P_{tx,RN}}{L_{RN-UE}\left(N + \frac{G_p P_{tx,RN}}{L_{RN-UE}}\right)} \qquad (4)$$

The optimal NB transmit power can be found by setting (4) and (2) to be equal.

Therefore:

$$P_{tx,NB} = \frac{L_{NB-RN} N P_{tx,RN}}{L_{RN-UE}\left(N + \frac{G_p P_{tx,RN}}{L_{RN-UE}}\right)} \qquad (5)$$

$$= \frac{L_{NB-RN} P_{tx,RN}}{\left(L_{RN-UE} + \frac{G_p P_{tx,RN}}{N}\right)}$$

(5) can be rearranged to find the intermediate RN transmit power given the source NB transmit power:

$$P_{tx,RN} = \frac{L_{RN-UE}}{\left(\frac{L_{NB-RN}}{P_{tx,NB}} - \frac{G_p}{N}\right)} \qquad (6)$$

2A. Regenerative Relay with TDD: Single Cell Model—FIG. 1A

It is assumed that the two links (source to intermediate, intermediate to destination) operate on the same frequency with TDD being used to separate the receive and transmit operation of the RN (i.e. it is no longer full duplex). If it is assumed that the timeslot in which the RN transmits is not used by the NB then the equations described above for the case of a regenerative relay with an FDD duplexing scheme can be used. However, if the source NB uses the same timeslot as the intermediate RN to communicate with apparatuses or nodes other than the NB, interference will result to the transmission made by the RN. In this case the SINR at a destination UE that is operable to receive communication signals from an intermediate RN is given by:

$$SINR_{RN-UE} = \frac{G_p P_{tx,RN}}{L_{RN-UE}(N+I)} \qquad (7)$$

$$= \frac{G_p P_{tx,RN}}{L_{RN-UE}\left(N + \frac{P_{tx\_tot,NB}}{L_{NB-UE}}\right)}$$

Where $P_{tx\_tot,NB}$ is the total transmission power from the NB and $L_{NB-UE}$ is the propagation loss on the NB to UE link. In this case the transmit power at the RN that ensures equal SINR is given by:

$$P_{tx,RN} = P_{tx,NB}\left(\frac{L_{RN-UE}}{L_{NB-RN}}\right)\left(1 + \frac{P_{tx\_tot,NB}}{NL_{NB-UE}}\right) \qquad (8)$$

Comparing equation (3) and equation (8) it is apparent that a simple ratio no longer yields the ideal balance. Assuming that $P_{tx\_tot,NB} = G_p P_{tx,NB}$ it is possible to write equation (8) as:

$$P_{tx,RN} = P_{tx,NB}\left(\frac{L_{RN-UE}}{L_{NB-RN}}\right)\left(1 + \frac{G_p P_{tx,NB}}{NL_{NB-UE}}\right) \qquad (9)$$

$$= \left(\frac{L_{RN-UE}}{L_{NB-RN}}\right)\left(P_{tx,NB} + \frac{G_p P_{tx,NB}^2}{NL_{NB-UE}}\right)$$

From (9) it is possible to determine the ideal RN transmit power given the NB transmit power. It is worth noting that if the set-up of the system is arranged such that the second term in the second bracket is negligible (i.e. $P_{tx\_tot,NB}/NL_{NB-UE} \ll 1$) then the criterion described above for the case of a regenerative relay with an FDD duplex scheme can be used.

It follows that the ideal NB transmit power given a certain RN transmit power can be found from the roots of (9). Expressing (9) in the following simplified form:

$$\frac{L_{RN-UE}}{L_{NB-RN}} P_{tx,NB} + \frac{L_{RN-UE}}{L_{NB-RN}} \frac{G_p}{NL_{NB-UE}} P_{tx,NB}^2 - P_{tx,RN} = 0 \quad (10)$$

$$ax^2 + bx + c = 0$$

Where $$x = P_{tx,NB},$$

$$a = \frac{G_p L_{RN-UE}}{NL_{NB-RN} L_{NB-UE}},$$

$$b = \frac{L_{RN-UE}}{L_{NB-RN}}$$

and $$c = -P_{tx,RN}$$

it follows that the roots of (10) are given by:

$$x = \frac{-b \pm \sqrt{b^2 - 4ac}}{2a} \quad (11)$$

As the transmit power is a positive number, only one root is defined, it therefore follows that the optimal transmit power at the NB that ensures equal SINR at the RN and UE is given by:

$$x = P_{tx,NB} = \frac{-b + \sqrt{b^2 + 4aP_{tx,RN}}}{2a} \quad (12)$$

Finally, it is possible to use the definitions above to rewrite (9), which gives the optimal RN transmit power, in a similar simplified form:

$$P_{tx,RN} = bP_{tx,NB} + aP_{tx,NB}^2 \quad (13)$$

2A. Regenerative Relay with TDD: Two-Cell Model as Shown in FIG. 1B

In addition to assuming that the deployment in both is identical and that the transmit powers on the NB and RN are the same, it is also assumed that where appropriate $P_{tx\_tot,RN} = G_p P_{tx,RN}$ and $P_{tx\_tot,NB} = G_p P_{tx,NB}$ and that for the case of TDD both RN's transmit at the same time. This in effect generates the worse case scenario for two cells.

In this case the SINR at the destination UE that is operable to receive signals from an intermediate RN is now:

$$SINR_{RN-UE} = \frac{G_p P_{tx,RN}}{L_{RN-UE}\left(N + \frac{2G_p P_{tx,NB}}{L_{NB-UE}} + \frac{G_p P_{tx,RN}}{L_{RN-UE}}\right)} \quad (14)$$

The optimal NB transmit power can be found by setting (14) and (2) to be equal:

$$\frac{G_p P_{tx,NB}}{NL_{NB-RN}} = \frac{G_p P_{tx,RN}}{L_{RN-UE}\left(N + \frac{2G_p P_{tx,NB}}{L_{NB-UE}} + \frac{G_p P_{tx,RN}}{L_{RN-UE}}\right)} \quad (15)$$

$$P_{tx,RN} = P_{tx,NB} \left(\frac{L_{RN-UE}}{L_{NB-RN}}\right)\left(1 + \frac{2P_{tx\_tot,NB}}{NL_{NB-UE}} + \frac{P_{tx\_tot,RN}}{NL_{RN}}\right)$$

$$\left(\frac{L_{RN-UE}}{L_{NB-RN}}\right)\left(\frac{2G_p}{NL_{NB-UE}}\right)P_{tx,NB}^2 +$$

$$\left(\frac{L_{RN-UE}}{L_{NB-RN}}\right)\left(1 + \frac{G_p P_{tx,RN}}{NL_{RN-UE}}\right)P_{tx,NB} - P_{tx,RN}$$

The optimal NB transmit power is found from the positive root of:

$$\left(\frac{L_{RN-UE}}{L_{NB-RN}}\right)\left(\frac{2G_p}{NL_{NB-UE}}\right)P_{tx,NB}^2 + \quad (16)$$

$$\left(\frac{L_{RN-UE}}{L_{NB-RN}}\right)\left(1 + \frac{G_p P_{tx,RN}}{NL_{RN-UE}}\right)P_{tx,NB} - P_{tx,RN} = 0$$

Which is given by:

$$x = P_{tx,NB} = \frac{-b + \sqrt{b^2 - 4ac}}{2a} \quad (17)$$

Where in this case $$a = \frac{2G_p L_{RN-UE}}{NL_{NB-RN} L_{NB-UE}},$$

$$b = \frac{L_{RN-UE}}{L_{NB-RN}}\left(1 + \frac{G_p P_{tx,RN}}{NL_{RN-UE}}\right) \text{ and}$$

$$c = -P_{tx,RN},$$

and both b and c are a function of the RN transmit power.

Given the NB transmit power it is possible to rearrange (15) to find the RN transmit. It follows that the optimal RN transmit power is given by:

$$P_{tx,RN} = \frac{\left(\frac{2G_p}{NL_{NB-UE}} \frac{L_{RN-UE}}{L_{NB-RN}}\right)P_{tx,NB}^2 + \left(\frac{L_{RN-UE}}{L_{NB-RN}}\right)P_{tx,NB}}{1 - \left(\frac{G_p}{NL_{RN-UE}} \frac{L_{RN-UE}}{L_{NB-RN}}\right)P_{tx,NB}} \quad (18)$$

3A. Non-Regenerative Relay Node (RN) with FDD—Single Cell Model as Shown in FIG. 1A

The difference between this case and that of a regenerative relay node being used in conjunction with a FDD duplexing scheme is that the SINR at the UE is a function of the SINR at the RN, where the SINR at the destination UE which is connected to the RN is given by:

$$SINR_{RN-UE} = \frac{G_p P_{tx,RN}}{L_{RN-UE}\left(N + \frac{P_{tx,RN}}{L_{RN-UE} SINR_{NB-RN}}\right)} \quad (19)$$

The result is that the ideal balance is no longer derived from setting the SINR at the UE equal to that at the RN. According to (19), the SINR at the RN needs to be set so that it does not prevent this target SINR at the UE from being obtained. However, the NB power must be controlled to limit the SINR at the RN rising beyond that practically required else excess interference and wasted transmit power will result.

FIG. 5 illustrates how the setting of NB and RN transmit power affects the SINR at the UE connected to the RN for a two different deployment scenarios.

Thus, it can be seen that the optimal solution is to select the transmit power of the NB and RN such that the system effectively operates on the diagonal fold in the surface shown in FIG. 5. It is possible to realise such a solution by taking the first derivative of (19) and finding the point at which increasing either the NB or RN transmit power results in minimal increase to SINR at UE.

In order to determine the first derivative of (19), it is rewritten as:

$$SINR_{RN-UE} = \frac{G_p P_{tx,RN}}{L_{RN-UE}\left(N + \frac{P_{tx,RN}}{L_{RN-UE}\frac{G_p P_{tx,NB}}{NL_{NB-RN}}}\right)} \quad (20)$$

$$= \frac{1}{\left(\frac{NL_{RN-UE}}{G_p P_{tx,RN}}\right) + \left(\frac{NL_{NB-RN}}{G_p^2 P_{tx,NB}}\right)}$$

Defining $$y = SINR_{RN-UE}, \; k_1 = \frac{NL_{RN-UE}}{G_p} \; \text{and} \; k_2 = \frac{NL_{NB-RN}}{G_p^2}$$

it is possible to simplify (20) to be:

$$y = \frac{1}{\frac{k_1}{P_{tx,RN}} + \frac{k_2}{P_{tx,NB}}} = \frac{P_{tx,NB}}{\frac{k_1 P_{tx,NB}}{P_{tx,RN}} + k_2} \quad (21)$$

In order to find the rate of change of SINR with $P_{tx,NB}$ the quotient rule for differentiation is used:

$$\frac{dy}{d(P_{tx,NB})} = \frac{k_2}{\left(\frac{k_1}{P_{tx,RN}}P_{tx,NB} + k_2\right)^2} = \nabla_{NB} \quad (22)$$

By solving (22) for $P_{tx,NB}$ given the required gradient and $P_{tx,RN}$ it is possible to find the optimal NB transmit power:

$$P_{tx,NB} = \frac{P_{tc,RN}\left(\sqrt{\frac{k_2}{\nabla_{NB}}} - k_2\right)}{k_1} \quad (23)$$

In order to find the optimal RN transmit power given that of the NB, the differentiation of (21) is now performed with respect to $P_{tx,RN}$. In this case the first order derivative is given by:

$$\frac{dy}{d(P_{tx,RN})} = \frac{k_1}{\left(\frac{k_2}{P_{tx,NB}}P_{tx,RN} + k_1\right)^2} = \nabla_{RN} \quad (24)$$

And the optimal RN transmit power given that of the NB is:

$$P_{tx,RN} = \frac{P_{tc,NB}\left(\sqrt{\frac{k_1}{\nabla_{RN}}} - k_1\right)}{k_2} \quad (25)$$

3B. Non-Regenerative Relay Node (RN) with FDD—Two Cell Model as Shown in FIG. 1B.

In a two cell model the SINR for the worse case of a destination UE at the cell edge is given by:

$$SINR_{RN-UE} = \frac{G_p P_{tx,RN}}{L_{RN-UE}\left(N + \frac{P_{tx,RN}}{L_{RN-UE}SINR_{NB-RN}} + \frac{G_p P_{tx,NB}}{L_{RN-UE}}\right)} \quad (26)$$

$$= \frac{1}{\left(\frac{NL_{RN-UE}}{G_p P_{tx,RN}}\right) + \left(\frac{NL_{NB-RN}}{G_p^2 P_{tx,NB}}\right) + 1}$$

Assuming that the transmit power of the two RN's is equal, the deployment is identical across the two cells and that $P_{tx\_tot,RN} = G_p P_{tx,RN}$, then the simplified form of (26) is given by:

$$SINR_{RN-UE} = \frac{1}{\frac{k_1}{P_{tx,RN}} + \frac{k_2}{P_{tx,NB}} + 1} \quad (27)$$

$$= \frac{P_{tx,NB}}{\left(\frac{k_1}{P_{tx,RN}} + 1\right)P_{tx,NB} + k_2}$$

The first derivative is now:

$$\frac{dy}{d(P_{tx,NB})} = \frac{k_2}{\left(\left(\frac{k_1}{P_{tx,RN}} + 1\right)P_{tx,NB} + k_2\right)^2} \quad (28)$$

Thus the optimal NB transmit power can be found by:

$$P_{tx,NB} = \frac{P_{tx,RN}\sqrt{\frac{k_2}{\nabla}} - k_2}{k_1 + P_{tx,RN}} \quad (29)$$

The optimal RN transmit power is found by taking the derivative of (27) with respect to $P_{tx,RN}$:

$$\frac{dy}{d(P_{tx,RN})} = \frac{k_1}{\left(\left(\frac{k_2}{P_{tx,NB}} + 1\right)P_{tx,RN} + k_1\right)^2} \quad (30)$$

Thus the optimal RN transmit power can be found by:

$$P_{tx,RN} = \frac{P_{tx,NB}\sqrt{\frac{k_1}{\nabla}} - k_1}{k_2 + P_{tx,NB}} \quad (31)$$

4A—Non-Regenerative Relay with TDD—Single Cell Model as Shown in FIG. 1A

This case is similar to that described above for a non-regenerative except for the fact that now interference from the NB must be taken into account due to the fact that it transmits on the same frequency and at the same time as the RN. In this case the SINR at the UE which is receiving communication signals transmitted by the RN is given by:

$$SINR_{RN-UE} = \frac{G_p P_{tx,RN}}{L_{RN-UE}\left(N + \frac{P_{tx,RN}}{L_{RN-UE}SINR_{NB-RN}} + \frac{P_{tx\_tot,NB}}{L_{NB-UE}}\right)} \quad (32)$$

If the $P_{tx,NB}/P_{tx,RN}$ is too large the SINR at the UE is limited due to insufficient RN transmit power and it is likely the area in which the link performance of a connection to a RN outperforms that for a connection to the NB is reduced. Conversely, if it is too small then the SINR at the UE is limited by the low SINR at the RN.

In this case, the balance is even finer than of that described in the case of a non-regenerative relay node employed in conjunction with an FDD duplexing scheme, as illustrated by FIG. 6. The optimal operating point is given by finding the point at which the first derivative of (32) is equal to zero. In order to find this optimal point, (32) is first rearranged in the following form:

$$SINR_{RN-UE} = \frac{G_p P_{tx,RN}}{L_{RN-UE}\left(N + \frac{P_{tx,RN}}{L_{RN-UE}\left(\frac{G_p P_{tx,NB}}{NL_{NB-RN}}\right)} + \frac{P_{tx\_tot,NB}}{L_{NB-UE}}\right)} \quad (33)$$

$$= \frac{1}{\left(\frac{NL_{RN-UE}}{G_p P_{tx,RN}}\right) + \left(\frac{NL_{NB-RN}}{G_p^2 P_{tx,NB}}\right) + \left(\frac{L_{RN-UE} P_{tx,NB}}{L_{NB-UE} P_{tx,RN}}\right)}$$

Defining $$y = SINR_{RN-UE}, k_1 = \frac{NL_{RN-UE}}{G_p} \text{ and } k_2 = \frac{NL_{NB-RN}}{G_p^2}$$

Using the definitions from the description in 3A above and $$k_3 = \left(\frac{L_{RN-UE}}{L_{NB-UE}}\right)$$

it is possible to simplify (33) to:

$$y = \frac{1}{\left(\frac{k_1}{P_{tx,RN}}\right) + \left(\frac{k_2}{P_{tx,NB}}\right) + \left(\frac{k_3 P_{tx,NB}}{P_{tx,RN}}\right)} \quad (34)$$

$$= \frac{P_{tx,NB}}{\left(\frac{k_1}{P_{tx,RN}}\right) P_{tx,NB} + k_2 + \left(\frac{k_3}{P_{tx,RN}}\right) P_{tx,NB}^2}$$

The next step is to find the single maxima of the parabolic function in (34) by solving:

$$\frac{dy}{dx} = 0 \quad (35)$$

Using the quotient rule to find the first derivative of (34):

$$\frac{dy}{d(P_{tx,NB})} = \frac{\frac{k_1}{P_{tx,RN}} P_{tx,NB} + k_2 + \frac{k_3}{P_{tx,RN}} P_{tx,NB}^2 - P_{tx,NB}\left(\frac{k_1}{P_{tx,RN}} + \frac{2k_3}{P_{tx,RN}} P_{tx,NB}\right)}{\left(\frac{k_1}{P_{tx,RN}} P_{tx,NB} + k_2 + \frac{k_3}{P_{tx,RN}} P_{tx,NB}^2\right)^2} \quad (36)$$

The maxima of y is found by setting (36) equal to zero and solving for $P_{tx,NB}$. It follows that the maximum SINR at the UE is obtained by setting:

$$\frac{k_1}{P_{tx,RN}} P_{tx,NB} + k_2 + \frac{k_3}{P_{tx,RN}} P_{tx,NB}^2 = P_{tx,NB}^2\left(\frac{k_1}{P_{tx,RN}} + \frac{2k_3}{P_{tx,RN}} P_{tx,NB}\right) \quad (37)$$

$$P_{tx,NB} = \sqrt{\frac{P_{tx,RN} k_2}{2k_3}}$$

Therefore, given the transmit power of the RN it is possible to use (37) to find the corresponding NB transmit power that ensures maximum SINR at the UE that is connected to the RN.

For the case of finding the optimal RN transmit power given the NB transmit power a similar approach to that described in above in the case of a non-regenerative relay node employed in conjunction with an FDD duplexing scheme, can be used as the SINR at the UE is not a parabolic function of RN transmit power. In order to find the optimal RN transmit power, (34) is rearranged to the following:

$$y = \frac{1}{\left(\frac{k_1}{P_{tx,RN}}\right) + \left(\frac{k_2}{P_{tx,NB}}\right) + \left(\frac{k_3 P_{tx,NB}}{P_{tx,RN}}\right)} \quad (38)$$

$$= \frac{P_{tx,RN}}{\left(\frac{P_{tx,RN} k_2}{P_{tx,NB}}\right) + k_3 P_{tx,NB} + k_1}$$

The first derivative is now:

$$\frac{dy}{d(P_{tx,RN})} = \frac{k_3 P_{tx,NB} + k_1}{\left(\left(\frac{P_{tx,RN} k_2}{P_{tx,NB}}\right) + k_3 P_{tx,NB} + k_1\right)^2} = \nabla \quad (39)$$

Solving (39) for $P_{tx,RN}$ gives the optimal RN transmit power given the NB transmit power:

$$P_{tx,RN} = \frac{P_{tx,NB}\left(\sqrt{\frac{k_3 P_{tx,NB} + k_1}{\nabla}} - (k_3 P_{tx,NB} + k_1)\right)}{k_2} \quad (40)$$

By observing the surface in FIG. 6 and from the form of (34) and the result in (40) it is apparent that if the NB transmit power is small then the rate of change of SINR with RN transmit power will decrease with increasing RN transmit power. However, for the case of large NB transmit power, the SINR at the UE approximates to a linear function of RN transmit power. The result is that in this case the solution to the problem, as summarised in (40) will be infinite.

4B—Non-Regenerative Relay with TDD—Two Cell Model as Shown in FIG. 1B

The worse case, from the perspective of a UE at the cell edge, is when the neighbouring cell employs a TDD scheme with the same timeslot used for RN transmission. If it is assumed that the cells are equal in size with the same deployment and transmit power settings and that $P_{tx\_tot,RN/NB} = G_p P_{tx,RN/NB}$ then:

$$SINR_{RN-UE} = \frac{G_p P_{tx,RN}}{L_{RN-UE}\left(N + \frac{P_{tx,RN}}{L_{RN-UE}SINR_{NB-R1}} + \frac{2G_p P_{tx,NB}}{L_{NB-UE}} + \frac{G_p P_{tx,RN}}{L_{RN-UE}}\right)} \quad (41)$$

$$= \frac{1}{\left(\frac{NL_{RN-UE}}{G_p P_{tx,RN}}\right) + \left(\frac{NL_{NB-RN}}{G_p^2 P_{tx,NB}}\right) + \left(\frac{2L_{RN-UE}P_{tx,NB}}{L_{NB-UE}P_{tx,RN}}\right) + 1}$$

In this case the simplified form of (4) is:

$$SINR_{RN-UE} = \frac{1}{\frac{k_1}{P_{tx,RN}} + \frac{k_2}{P_{tx,NB}} + \frac{2k_3}{P_{tx,RN}}P_{tx,NB} + 1} \quad (42)$$

$$= \frac{P_{tx,NB}}{\left(\frac{k_1}{P_{tx,RN}} + 1\right)P_{tx,NB} + k_2 + \frac{2k_3}{P_{tx,RN}}P_{tx,NB}^2}$$

And the first derivative is:

$$\frac{dy}{d(P_{tx,NB})} = \frac{\left(\frac{k_1}{P_{tx,RN}} + 1\right)P_{tx,NB} + k_2 + \frac{2k_3}{P_{tx,RN}}P_{tx,NB}^2 - P_{tx,NB}\left(\frac{k_1}{P_{tx,RN}} + 1 + \frac{4k_3}{P_{tx,RN}}P_{tx,NB}\right)}{\left(\left(\frac{k_1}{P_{tx,RN}} + 1\right)P_{tx,NB} + k_2 + \frac{2k_3}{P_{tx,RN}}P_{tx,NB}^2\right)^2} \quad (43)$$

Finally, the maxima is given by setting (43) equal to zero and solving for $P_{tx,NB}$:

$$\left(\frac{k_1}{P_{tx,RN}} + 1\right)P_{tx,NB} + k_2 + \frac{2k_3}{p_{tx,RN}}P_{tx,NB}^2 = \quad (44)$$

$$P_{tx,NB}\left(\frac{k_1}{P_{tx,RN}} + 1 + \frac{4k_3}{P_{tx,RN}}P_{tx,NB}\right)$$

$$k_2 + \frac{2k_3}{p_{tx,RN}}P_{tx,NB}^2 = \frac{4k_3}{P_{tx,RN}}P_{tx,NB}^2$$

$$P_{tx,NB} = \sqrt{\frac{P_{tx,RN}k_2}{2k_3}}$$

In order to find the optimal RN transmit power given the NB transmit power (42) is rearranged to:

$$y = \frac{1}{\frac{k_1}{P_{tx,RN}} + \frac{k_2}{P_{tx,NB}} + \frac{2k_3}{P_{tx,RN}}P_{tx,NB} + 1} \quad (45)$$

$$= \frac{P_{tx,RN}}{k_1 + \frac{k_2 P_{tx,RN}}{P_{tx,NB}} + 2k_3 P_{tx,NB} + P_{tx,RN}}$$

The first derivative is now:

$$\frac{dy}{d(P_{tx,RN})} = \frac{k_1 + 2k_3 P_{tx,NB}}{\left(k_1 + 2k_3 P_{tx,NB} + P_{tx,RN}\left(1 + \frac{k_2}{P_{tx,NB}}\right)\right)^2} = \nabla \quad (46)$$

Solving (46) for $P_{tx,RN}$ gives the optimal RN transmit power given the NB transmit power:

$$p_{tx,RN} = \frac{P_{tx,NB}\sqrt{\frac{k_1 + 2k_3 P_{tx,NB}}{\nabla}} - (k_1 + 2k_3 P_{tx,NB})}{(P_{tx,NB} + k_2)} \quad (47)$$

Again, in the case of large NB transmit power, the SINR at the UE approximates to a linear function of RN transmit power. The result is that the solution to (47) will be infinite.

The optimal transmit power balance will now be determined based on the solutions developed above for the different relay and duplexing schemes and for two separate deployment scenarios. These deployment scenarios are summarised in Table III and the propagation parameters of the pathloss equation in (48) are in Table IV.

$$L = b + 10n \log d \quad (48)$$

Where L is the pathloss in dB, b is in dB and is given in Table along with n, and d is the transmitter-receiver separation in meters.

TABLE III

Deployment scenarios

| | Scenario | |
|---|---|---|
| Parameter | 1 | 2 |
| Cell Radius | 1867 m | |
| Relay Position | 933 m | 1400 m |

The transmitter receiver separation is the same as the cell radius (i.e. the UE is located at the cell radius). The RN position quoted is relative to the centre of the cell which is where the NB is located. The RN positions are therefore the distance from the NB to RN. The RN-UE is then the difference of the cell radius and the NB-RN separation.

TABLE IV

Propagation parameters.

| | Link | | |
|---|---|---|---|
| Parameter | NB-UE | NB-RN | RN-UE |
| b (dB) | 15.3 | 15.5 | 28 |
| n | 3.76 | 3.68 | 4 |

Regenerative Relay

Substituting the values given in Table III and Table IV into equations (3) and (5) for FDD and (12) and (17) for TDD it is possible to find the optimal NB transmit power given the RN transmit power. FIG. 7A shows the optimal NB transmit power as a function of RN transmit power for both FDD and TDD for the two deployment scenarios.

Non-Regenerative Relay with FDD

Substituting the parameters into (23) and (24) it is possible to find the optimal NB transmit power for the two deployment scenarios, as shown in FIG. 7B.

Non-Regenerative Relay with TDD

Figure 7C:
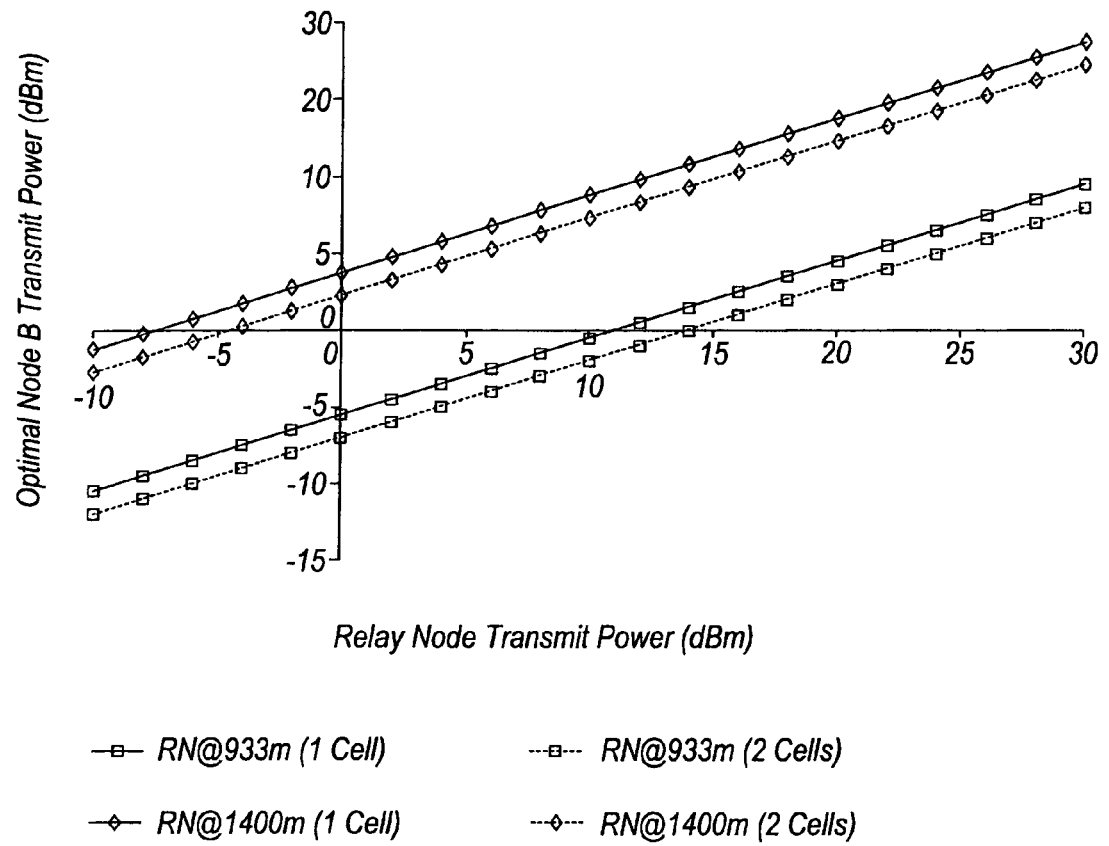

Substituting the parameters into (37) and (44) it is possible to find the optimal NB transmit power for the two deployment scenarios, as shown in FIG. 7C.

System Level Simulation Results

System simulation of a multi-hop HSDPA network employing non-regenerative relays with TDD duplexing with relays transmitting in every third transmission time interval have been conducted in order to validate the predicted throughput gain optimal transmit power setting based on results of FIG. 7C, with the average packet call throughput gain being determined as the transmit powers of the RN and NB are varied around the optimal point.

Results of a system level simulation for the two deployment scenarios detailed above in Table III will now be presented. The simulation parameters are listed below in Table V and Table VI.

TABLE V

Deployment parameters

| Parameter | | Value |
|---|---|---|
| Base Station | Inter-cell Separation | 2.8 km |
| | Sectors/cell | 3 |
| | Antenna Height | 15 m |
| | Antenna Gain | 17 dBi |
| Relay Station | RN antenna | 120° |
| | Position | ½ and ¾ cell radius |
| | Num/cell | 9 |
| | Antenna Height | 5 m |
| | Antenna Gain | 17 dBi |

TABLE V-continued

Deployment parameters

| Parameter | | Value |
|---|---|---|
| User | Number per sector | 50 |
| Equipment | Initial Distribution | Random |
| | Velocity | 3 km/h |
| | Direction | Semi-directed |
| | Update | 20 m |
| Traffic Models | | WWW |

TABLE VI

Simulation parameters

| Parameters | | Value |
|---|---|---|
| Base Station/ | HS-DSCH power | Variable |
| Relay Node | CPICH power | 20% of total |
| | HARQ scheme | Chase |
| | HS-DSCH/frame | 15 |
| | Relay buffer size | 1.78 Mbits |
| | Ack/NAck Detection | Error free |
| | NB Scheduler | Round Robin |
| | Relay type | Amplify & Forward |
| User | Thermal Noise Density | 10–174 dBm/Hz |
| Equipment | Noise Figure | 5 dBm |
| | Detector | MMSE |
| | All other as [3] what's this? | |

For both deployment scenarios the gain in the average packet call throughput experienced by the users on that observed for the case of a single hop system with NB transmission power of 30 dBm is plotted as a function of NB transmit power for four different RN transmit powers. FIG. 8A shows the gain for deployment scenario 1 and FIG. 8B shows the gain for scenario 2.

Note that the channel gain for the NB to UE link was 3 dB higher than for the NB to RN and RN to UE link. This means that the interference experienced by a UE connected to a RN from another NB is double that used in the link analysis discussed above with reference to FIGS. 7A, 7B and 7C. The channel gain is due to the fact that a number of replicas of the transmitted signal are received, when the power on all these is added it is found that for the case of the NB to UE channel the total power is double that on the NB to RN or RN to UE channel. This accounts for the 3 dB gain, as 3 dB equates to double. As a result of the channel gain being higher for the NB to UE channel, this means that the received signal power will be 3 dB (or double) higher than that used in the analysis up to that point where no channel gain through multi-path was considered.

Comparison of Link Based Prediction and System Simulation

FIG. 9 shows the optimal NB transmit power as a function of RN transmit power for a non-regenerative relay for TDD for each deployment scenario where it is assumed the NB to UE link has a 3 dB gain compared with the other links. In this case, the predicted transmit power at the NB for the RN transmit power used in the simulation are listed in Table VII along with the throughput gain that would be experienced if these settings were used and the maximum achievable.

TABLE IIII

Predicted optimal NB transmit power and resulting simulated throughput gain that would have been achieved from this setting compared with the maximum gain observed.

| | NB Transmit Power (dBm) & User Packet Throughput Gain | | | | | |
|---|---|---|---|---|---|---|
| | Scenario 1 | | | Scenario 2 | | |
| RN Transmit Power (dBm) | Predicted | Throughput Gain | Max Gain | Predicted | Throughput Gain | Max Gain |
| 16 | −0.5 | 33% | 40% | 8.8 | 60% | 67% |
| 19 | 1 | 38% | 43% | 10.3 | 65% | 74% |
| 22 | 2.5 | 41% | 46% | 11.8 | 68% | 74% |
| 25 | 4 | 49% | 51% | 13.3 | 72% | 75% |

Table VII, FIG. 7A and FIG. 8B suggest that if power balancing is performed according to a preferred embodiment of the present invention using a technique based on the equations developed above then the selected power balance will in general be in the region of the optimal point. In particular, for the transmit powers used the gain was shown to always be within 10% of the achievable maximum, with the difference being due to shortcomings of using of a two-cell model to model a multi-cell system.

The necessity of transmit power balancing is apparent in the results presented in both FIG. 8A and FIG. 8B where it is shown that if the NB transmit is increased beyond the optimal point then a significant degradation in gain will be experienced despite the emission of more signal energy. It also shows that if the NB transmit power is selected carefully then the sensitivity of the gain to RN transmit power is reduced.

The invention claimed is:

1. A communication system comprising a user equipment, a base station and at least one intermediate apparatus, the user equipment being operable to transmit a communication signal, via the or each intermediate apparatus, to the base station, wherein the base station and the/each intermediate apparatus comprise an indicator derivator operable to derive one or more indicators of the received signal strength of a communication signal received at the base station, or at the intermediate apparatus respectively, the base station comprising:

i) an indicator deviation detector, operable to detect a deviation in the, or one of the, indicators of the received signal strength derived by the base station, from a desired value at which the indicators of the received signal strength of the communication signal received at the base station and at the intermediate apparatus are substantially in balance;

ii) a receiving unit operable to receive from the intermediate apparatus an indicator of the received signal strength derived at the intermediate apparatus;

iii) an imbalance detector periodically operable to detect an imbalance between one said indicator of the received signal strength derived by the base station and one said indicator of the received signal strength derived by the intermediate apparatus and received by the receiving unit, wherein the imbalance detector comprises a pathloss updater operable, following receipt of said indicators from both said base station and said intermediate apparatus, or following a change in one or both of said indicators received by a controller, to determine a measure of the pathloss experienced by a communication signal being transmitted between the user equipment and the intermediate apparatus, and between the intermediate apparatus and the base station; and iv) a controller, provided in the base station, the controller comprising a first calculator operable, following detection of a deviation by the indicator deviation detector caused by a change in a target value of the desired value, to calculate a new transmit power for the intermediate apparatus, or a new transmit power for the intermediate apparatus and the user equipment, that will: a) restore balance between one said indicator subsequently derived by the intermediate apparatus and one said indicator subsequently derived by the base station; or b) prevent said imbalance from arising, and a second calculator operable, following detection of an imbalance by the imbalance detector caused by a change in a pathloss between the intermediate apparatus and the base station determined by the pathloss updater, to calculate a new transmit power for the user equipment which will restore balance between one said indicator subsequently derived by said base station and one said indicator subsequently derived by said intermediate apparatus, wherein the controller is operable, following the calculation of a new transmit power for the user equipment, to transmit a command to the user equipment commanding a change in the transmit power of the user equipment and, following the calculation of a new transmit power for the intermediate apparatus, to transmit a command to the intermediate apparatus commanding a change in the transmit power of the intermediate apparatus, and wherein if said command transmitted to said user equipment is for an increase in transmit power, the controller is further operable to monitor said indicator derived by the intermediate apparatus in order to determine if said transmit power of said source apparatus has been changed in accordance with said command, wherein if it is determined that a change in transmit power of the source apparatus has not been carried out in accordance with said command, said controller is operable to prohibit any subsequent increases in transmit power of said intermediate apparatus, and wherein if an increase in transmit power of said intermediate apparatus is prohibited, and if no subsequent imbalance is detected by said imbalance detector, said controller is operable to allow a subsequent increase in transmit power of said intermediate apparatus.

2. A communication system as claimed in claim 1, wherein one said indicator derived by each of the intermediate apparatus and the base station comprises a measure of the strength of a communication signal received at the intermediate apparatus, or at the base station, as the case may be.

3. A communication system as claimed in claim 1, wherein one said indicator derived by each of the intermediate apparatus and the base station comprises a measure of the signal-to-interference plus noise ratio (SINR) of a communication signal respectively received at the intermediate apparatus or at the base station, as the case may be.

4. A communication system as claimed in claim 1, wherein one said indicator derived by each of the intermediate apparatus and the base station comprises a measure of the variation of the quality of a communication signal respectively received at the intermediate apparatus, or at the base station, from a target received signal quality.

5. A communication system as claimed in any claim 1, wherein said imbalance comprises a difference between a measure of the signal-to-interference plus noise ratio of a communication signal received at the base station and a measure of the signal-to interference plus noise ratio of a communication signal received at the intermediate apparatus.

6. A communication system as claimed in claim 1, wherein the indicator deviation detector is provided in the base station, and wherein the base station further comprises a request transmitter operable, following detection of a deviation by said indicator deviation detector, to transmit a request to said first calculator, either directly or via the intermediate apparatus, for the calculation of a new transmit power for the intermediate apparatus which will a) reduce an imbalance between a measure of a quality of a communication signal received at the intermediate apparatus and a measure of the quality of a communication signal received at the base station; or b) prevent said imbalance from arising.

7. A communication system as clamed in claim 6, wherein the first calculator is operable to receive a request transmitted by said base station and wherein said first calculator is operable, following receipt of such request by the controller, to calculate a new transmit power for the intermediate apparatus which will satisfy the request.

8. A communication system as claimed in claim 1, wherein the controller is operable, following a calculation of a new transmit power for the intermediate apparatus by said first calculator, to determine if said new transmit power of the intermediate apparatus is greater than a maximum transmit power of the intermediate apparatus.

9. A communication system as claimed in claim 8, wherein if it is determined by the controller that said new transmit power is greater than said maximum transmit power, the first calculator calculates a second new transmit power for the intermediate apparatus which does not exceed said maximum transmit power of the intermediate apparatus.

10. A communication system as claimed in claim 7, wherein the controller is operable to receive an input signal which allows the controller to determine if the request is due to a deviation in a variation from target indicator derived by the base station which arises due to a change in the target received signal quality set for the base station.

11. A communication system as claimed in claim 10 wherein, if it is determined that the request is due to a deviation in a variation from target indicator derived by the base station, the first calculator is further operable to calculate a new transmit power for the user equipment, based on the new transmit power calculated for the intermediate apparatus, to thereby tend substantially prevent an imbalance between a measure of a quality of a communication signal received at the intermediate apparatus and a measure of the quality of a communication signal received at the base station from arising.

12. A communication system as clamed in claim 11, wherein the controller is operable, following a calculation of a new transmit power for the user equipment, to determine if said new transmit power for the user equipment is greater than a maximum transmit power for the user equipment.

13. A communication system as claimed in claim 12, wherein if it is determined by the controller that said new transmit power is greater than the maximum transmit power of the user equipment, the first calculator calculates a second new transmit power for the user equipment which does not exceed said maximum.

14. A communication system as claimed in claim 13, wherein said first calculator is operable, following the calculation of a second new transmit power for the user equipment, to calculate a second new transmit power for the intermediate apparatus which will tend to prevent an imbalance from arising.

15. A communication system as claimed in claim 1, wherein the pathloss updater determines the measure of the pathloss experienced by a communication signal being transmitted between the user equipment and the intermediate apparatus from a measure of the transmit power of the user equipment when that communication signal was transmitted.

16. A communication system as claimed in claim 1, wherein the pathloss updater determines the measure of the pathloss experienced by a communication signal being transmitted between the intermediate apparatus and the base station from a measure of the transmit power of the intermediate apparatus when that communication signal was transmitted.

17. A communication system as claimed in claim 16, wherein the intermediate apparatus is operable to transmit a transmit power indicator, which is indicative of a measure of a current transmit power of the intermediate apparatus, to the pathloss updater, the pathloss updater being operable to receive said transmit power indicator and to utilise said transmit power indicator to determine the pathloss experienced by a communication signal being transmitted between the intermediate apparatus and the base station.

18. A communication system as claimed in claim 1, wherein the knowledge of the transmit power of the intermediate apparatus is determined from i) a measure of the transmit power of the intermediate apparatus at an initial time and ii) knowledge of changes in the transmit power of the intermediate apparatus which have occurred since said initial time.

19. A communication system as claimed in claim 1, wherein the indicator deviation detector is provided in the base station, and wherein the base station further comprises a request transmitter operable, following detection of a deviation by said indicator deviation detector, to transmit a request to said first calculator, either directly or via the intermediate apparatus, for the calculation of a new transmit power for the intermediate apparatus which will a) reduce an imbalance between a measure of a quality of a communication signal received at the intermediate apparatus and a measure of the quality of a communication signal received at the base station; or b) prevent said imbalance from arising and wherein, in the absence of a request for a change in the transmit power of the intermediate apparatus from the base station, and following a change in the measure of the pathloss experienced between the intermediate apparatus and the base station as determined by the pathloss updater, the second calculator is operable to calculate the change in the transmit power of the user equipment that is required to in order to tend to balance the signal strength indicators derived at the intermediate and base station.

20. A communication system as claimed in claim 1, wherein the controller is operable to receive an input signal which allows the controller to determine if the request is due to a deviation in a variation from target indicator derived by the base station which arises due to a change in the target received signal quality set for the base station and wherein said input signal comprises an indicator of the pathloss experienced between the intermediate apparatus and the base station as determined by said pathloss updater.

21. A method of controlling the transmit power of one or more communication apparatus of a communication system, which apparatus is operable to transmit a communication signal in a multi-hop communication system, the communication system comprising a user equipment, a base station and at least one intermediate apparatus, the user equipment being operable to transmit a communication signal, via the or each intermediate apparatus, to the base station, the method comprising the steps of:
  i) deriving, at each of the base station and the intermediate apparatus, one or more indicators of the received signal strength of a communication signal respectively received at the base station, or at the intermediate apparatus;
  ii) receiving, at the base station from the intermediate apparatus, an indicator of the received signal strength derived at the intermediate apparatus;
  iii) detecting a deviation in the, or one of the, indicators of the received signal strength derived at the base station, from a desired value at which the indicators of the received signal strength of the communication signal received at the base station and at the intermediate apparatus are substantially in balance, and calculating, following the detection of such a change caused by a change in a target value of the desired value, a new transmit power for the intermediate apparatus, or a new transmit power for the intermediate apparatus and the user equipment, which will: a) restore balance between one said indicator subsequently derived by the intermediate apparatus and one said indicator subsequently derived by the base station; or b) prevent said imbalance from arising;
  iv) detecting an imbalance between one said indicator of the received signal strength derived by the base station and one said indicator of the received signal strength derived by the intermediate apparatus by: following receipt of said indicators from both said base station and said intermediate apparatus, or following a change in one or both of said indicators, determining a measure of the pathloss experienced by a communication signal being transmitted between the user equipment and the intermediate apparatus, and between the intermediate apparatus and the base station; and
  v) calculating, following the detection of such an imbalance caused by a change in a pathloss between the intermediate apparatus and the base station determined by the pathloss updater, a new transmit power for the user equipment, which will restore balance between one said indicator subsequently derived by said base station and one said indicator subsequently derived by said intermediate apparatus;
  vi) following the calculation of a new transmit power for the user equipment, transmitting a command to the user equipment commanding a change in the transmit power of the user equipment and, following the calculation of a new transmit power for the intermediate apparatus, transmitting a command to the intermediate apparatus commanding a change in the transmit power of the intermediate apparatus,
  and wherein if said command transmitted to said user equipment is for an increase in transmit power, monitoring said indicator derived by the intermediate apparatus in order to determine if said transmit power of said source apparatus has been changed in accordance with said command, wherein if it is determined that a change in transmit power of the source apparatus has not been carried out in accordance with said command, prohibiting any subsequent increases in transmit power of said intermediate apparatus, and wherein if an increase in transmit power of said intermediate apparatus is prohibited, and if no subsequent imbalance is detected by said imbalance detector, allowing a subsequent increase in transmit power of said intermediate apparatus.

22. A base station operable to receive, via at least one intermediate apparatus, a communication signal transmitted from a user equipment, the base station comprising:
  i) an indicator derivator, operable to derive one or more indicators of a received signal strength of a communication signal received at the base station;
  ii) a receiver, operable to receive one or more indicators from the intermediate apparatus, the or each indicator being indicative of a received signal strength of a communication signal received at the intermediate apparatus;
  iii) an indicator deviation detector, operable to detect a deviation in one said indicator of the received signal strength derived by the indicator derivator from a desired value at which the indicators of the received signal strength of the communication signal received at the base station and at the intermediate apparatus are substantially in balance;
  iv) an imbalance detector periodically operable to detect an imbalance between one said indicator of the received signal strength derived by the base station and one said indicator of the received signal strength derived by and received from the intermediate apparatus, wherein the imbalance detector comprises a pathloss updater operable, following receipt of said indicators from both said base station and said intermediate apparatus, or following a change in one or both of said indicators received by a controller, to determine a measure of the pathloss experienced by a communication signal being transmitted between the user equipment and the intermediate apparatus, and between the intermediate apparatus and the base station; and
  v) a controller comprising
    a first calculator operable, following detection of a deviation by the indicator deviation detector caused by a change in a target value of the desired value, to calculate a new transmit power for the intermediate apparatus, or a new transmit power for the intermediate apparatus and the user equipment, that will: a) restore balance between one said indicator subsequently derived by the intermediate apparatus and one said indicator subsequently derived by the base station; or b) prevent said imbalance from arising, and
    a second calculator operable, following detection of an imbalance by the imbalance detector caused by a change in a pathloss between the intermediate apparatus and the base station determined by the pathloss updater, to calculate a new transmit power for the user equipment which will restore balance between one said indicator subsequently derived by said base station and one said indicator subsequently derived by said intermediate apparatus,
  wherein the controller is operable, following the calculation of a new transmit power for the user equipment to transmit a command to the user equipment commanding a change in the transmit power of the user equipment and, following the calculation of a new transmit power for the intermediate apparatus, to transmit a command to the intermediate apparatus commanding a change in the transmit power of the intermediate apparatus, and wherein if said command transmitted to said user equipment is for an increase in transmit power, the controller is further operable to monitor said indicator derived by the intermediate apparatus in order to determine if said transmit power of said source apparatus has been changed in accordance with said command, wherein if it is determined that a change in transmit power of the source apparatus has not been carried out in accordance with said command, said controller is operable to prohibit any subsequent increases in transmit power of said intermediate apparatus, and wherein if an increase in transmit power of said intermediate apparatus is prohibited, and if no subsequent imbalance is detected by said imbalance detector, said controller is operable to allow a subsequent increase in transmit power of said intermediate apparatus.

23. A base station as claimed in claim 22, wherein said base station is operable to receive an input signal which allows the controller to determine if a request for a new transmit power for the user equipment is due to a change in the deviation from a desired value of an indicator derived by the base station.

24. A base station as claimed in claim 22, the controller further comprising commander operable to issue a command to said intermediate apparatus and/or said user equipment, commanding a change in the transmit power of the intermediate apparatus, and/or the transmit power of the user equipment to change in accordance with the new transmit power calculated by the first calculator.

25. A base station as claimed in claim 22, wherein the imbalance detector further comprises a pathloss updater operable to determine a measure of the pathloss experienced by a communication signal being transmitted between the user equipment and the intermediate apparatus, and between the intermediate apparatus and the base station.

26. A base station as claimed in claim 22, the controller further comprising a commander operable to issue a command to said user equipment commanding a change in the transmit power of the user equipment in accordance with the new transmit power calculated by the calculator.

27. A non-transitory computer-readable medium that stores a computer program which is loadable into a computer and which, when loaded into the computer, causes the computer to become the base station of the communication system as claimed in claim 22.

* * * * *